(12) United States Patent
Kim et al.

(10) Patent No.: US 6,853,498 B2
(45) Date of Patent: Feb. 8, 2005

(54) ZOOM LENS

(75) Inventors: Sung-Woo Kim, Changwon (KR); Young-Woo Park, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 10/853,669

(22) Filed: May 25, 2004

(65) Prior Publication Data

US 2004/0257671 A1 Dec. 23, 2004

(30) Foreign Application Priority Data

Jun. 18, 2003 (KR) ................................ 10-2003-0039497
Oct. 21, 2003 (KR) ................................ 10-2003-0073343

(51) Int. Cl.[7] ............................................. G02B 15/14
(52) U.S. Cl. ........................................................ 359/689
(58) Field of Search ........................................ 359/689

(56) References Cited

U.S. PATENT DOCUMENTS 5,646,777 A * 7/1997 Ohshita ..................... 359/422

FOREIGN PATENT DOCUMENTS

| JP | 56-123512 A | 9/1981 |
| JP | 63-292106 A | 11/1988 |
| JP | 05-173071 A | 7/1993 |
| JP | 06-094996 A | 4/1994 |
| JP | 09-021950 A | 1/1997 |
| JP | 10-213745 A | 8/1998 |
| JP | 11-084243 A | 3/1999 |
| JP | 2000-267009 A | 9/2000 |

* cited by examiner

Primary Examiner—Scott J. Sugarman
Assistant Examiner—M. Hasan
(74) Attorney, Agent, or Firm—Gardner Carton & Douglas LLP

(57) ABSTRACT

The zoom lens comprises, in order from an object side: a first lens group having a negative refractive power, the first lens group including a first lens having a negative refractive power, and a second lens having a positive refractive power; a second lens group having a positive refractive power, the second lens group including a third lens having a positive refractive power, and a fourth lens having a negative refractive power; and a third lens group having a positive refractive power, the third lens group including a fifth lens having a positive refractive power, the zoom lens satisfying the following conditional expression:

$$-3.0 < \frac{f_1}{f_w} < -2.0$$

where $f_1$ denotes the focal length of the first lens group; and $f_w$ denotes the total focal length at a wide-angle position.

27 Claims, 18 Drawing Sheets

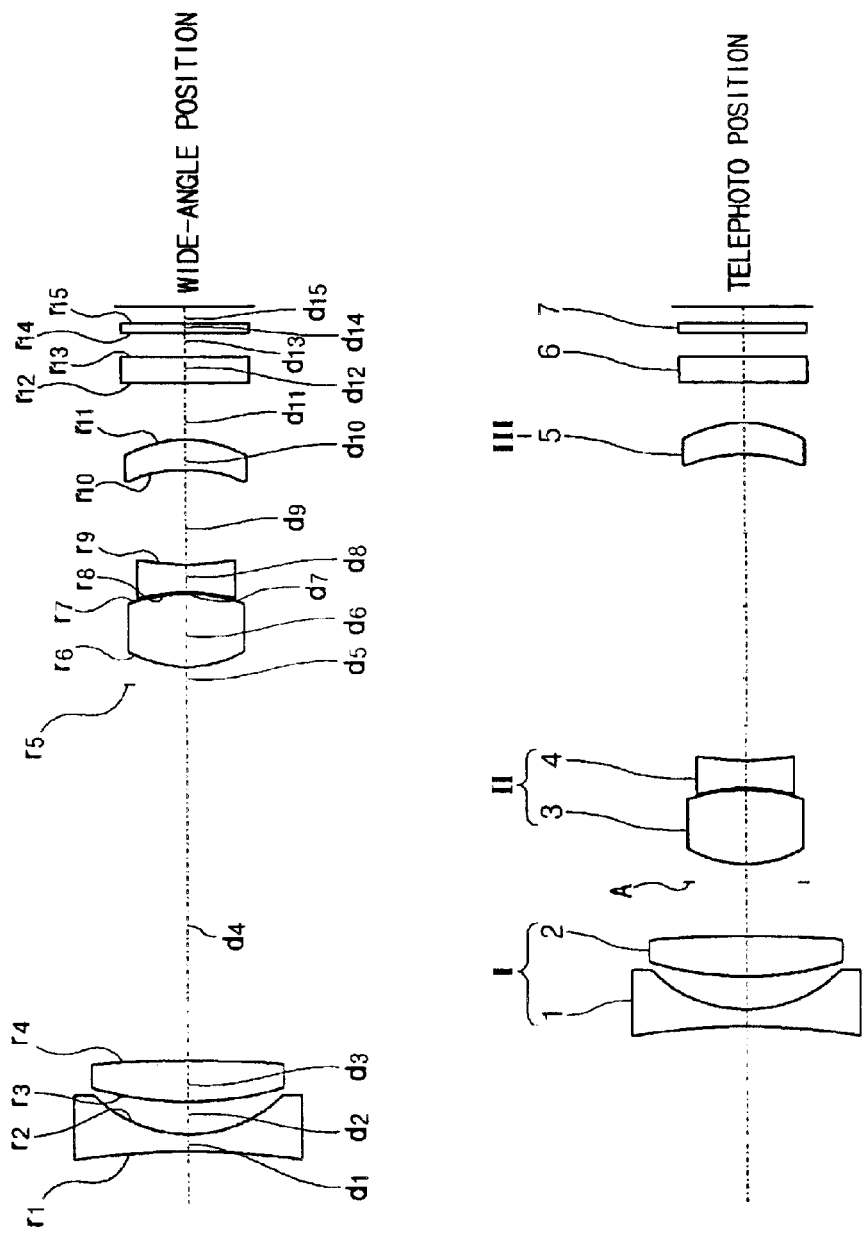

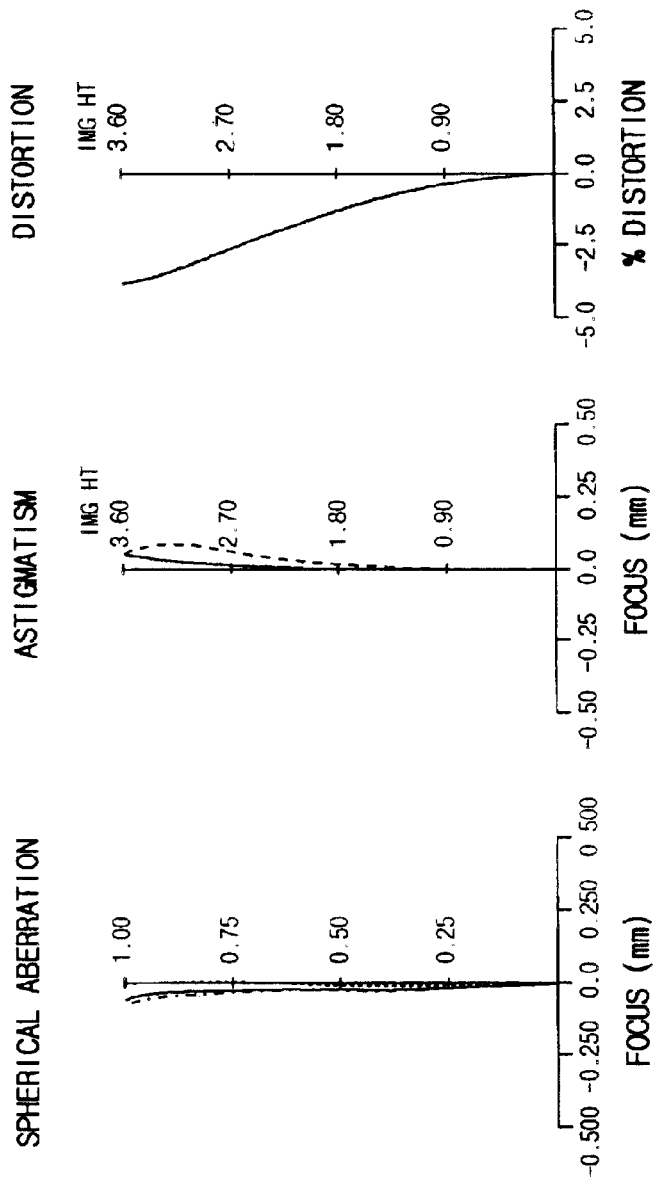

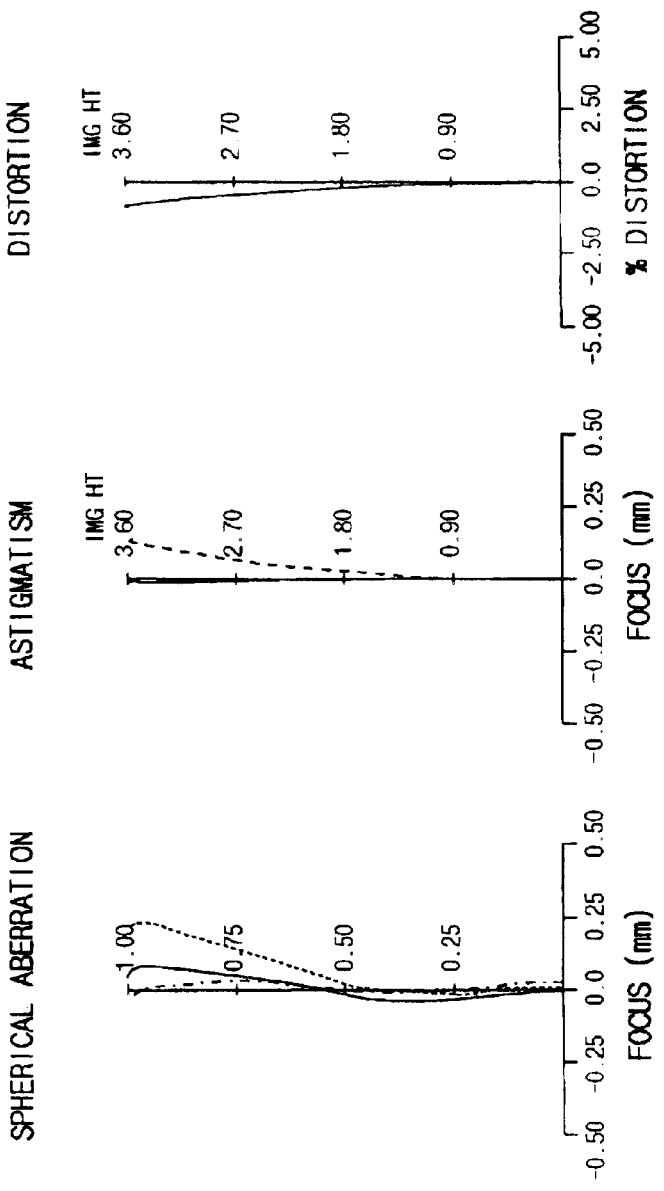

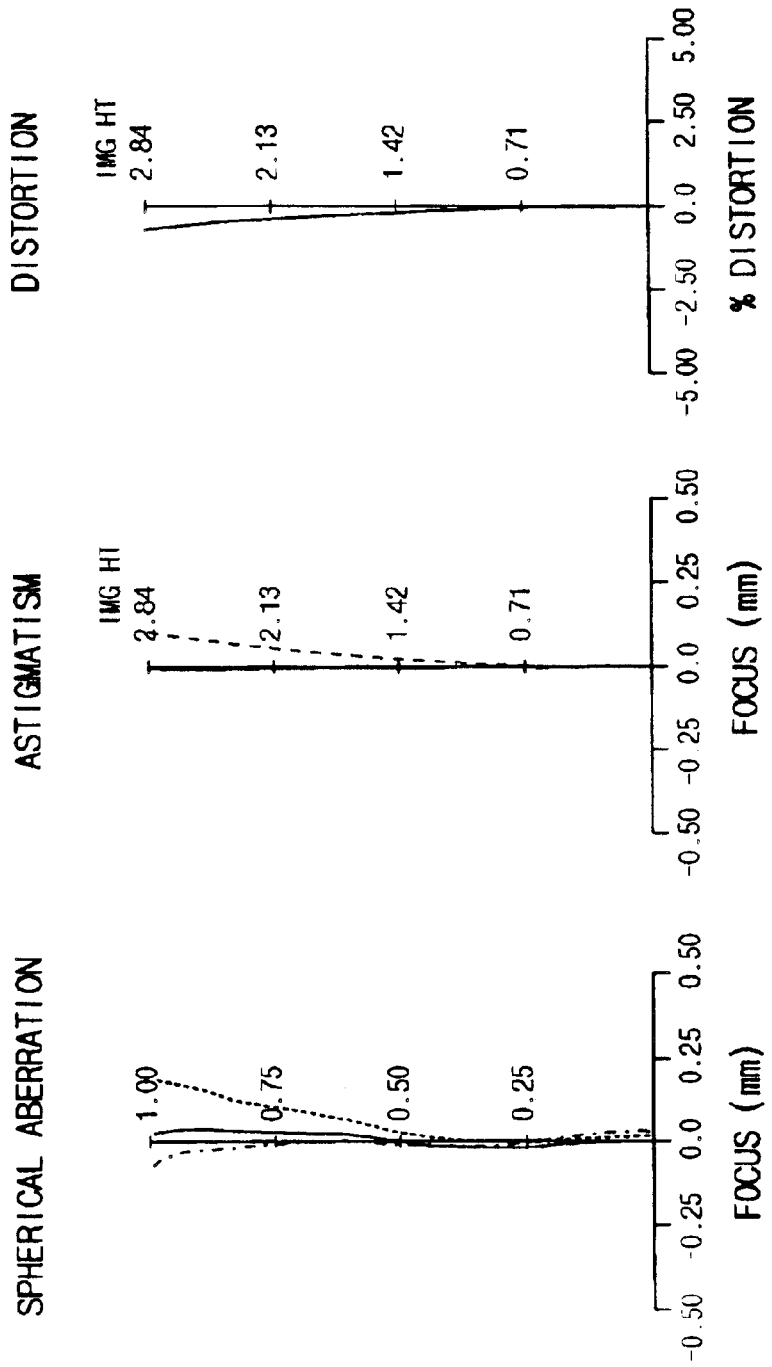

ZOOM LENS

CROSS REFERENCE TO RELATED APPLICATION

This application claims priority to and the benefit of Korean Patent Application No. 2003-39497 filed on Jun. 18, 2003 and Korean Patent Application No. 2003-73343 filed on Oct. 21, 2003 in the Korean Intellectual Property Office, the contents of which are incorporated herein by reference.

BACKGROUND OF THE INVENTION (a) Field of the Invention

The present invention relates to a zoom lens. More specifically, the present invention relates to a miniature zoom lens for cameras using an image pickup device such as a charge-coupled device (CCD).

(b) Description of the Related Art

Recently, the use of electronic still cameras and video cameras employing a CCD or a solid-state image pickup device has been expanding rapidly. Cameras are being built into mobile phones, so the needs for miniaturization and weight/cost savings are increasing. Miniaturization and weight/cost savings are also needed for zoom lenses that are built into cameras.

The implementation methods for a zoom lens include a method of properly arranging a small number of lenses to provide a small zoom lens with high image quality, and a method of using plastic lenses to realize a low-cost zoom lens.

The conventional optical system realized by the former method is disclosed in Japanese Patent Application Laid-Open No. 1998-213745. The zoom lens disclosed in this cited patent comprises, in order from an object side: a first lens group entirely having a negative refractive power with one or two negative lenses and one positive lens; a second lens group entirely having a positive refractive power with one positive lens and one negative lens; and a third lens group entirely having a positive refractive power with at most two lenses. This zoom lens is characterized in that the third lens group is moved with a convex locus on the image side during zooming from the wide-angle position to the telephoto position. The focal length of the first lens group divided by the total focal length at the wide-angle position is between 2.5 and 4.0. The second lens group is comprised of a lens having a strong positive refractive power and a meniscus lens having a negative refractive power so as to control the spherical aberration and astigmatism, and the meniscus negative lens is used to eliminate the chromatic aberration.

However, the zoom lens has a problem in regard to a great displacement of the third lens group, so it is difficult to realize the miniaturization of the zoom lens.

On the other hand, the conventional optical systems employing the latter method are disclosed in Japanese Patent Application Laid-Open Nos. 1997-21950 and 2000-267009. Among those conventional techniques, the zoom lens disclosed in Japanese Patent Application Laid-Open No. 1997-21950 includes, in order from an object side, a first lens group having a negative refractive power, a second lens group having a positive refractive power, and a third lens group having a positive refractive power. Each of the first and second lens groups includes at least three lenses of which at least two lenses are plastic lenses. But, this zoom lens uses a large number of lenses to increase the size of the optical system and it becomes difficult to realize a low-cost optical system.

The conventional optical systems using a solid-state image pickup device are as follows:

(1) Japanese Patent Application Laid-Open No. Sho 56-123512

(2) Japanese Patent Application Laid-Open No. Sho 63-292106

(3) Japanese Patent Application Laid-Open No. Pyung 6-94996

(4) Japanese Patent Application Laid-Open No. Pyung 5-173071

(5) Japanese Patent Application Laid-Open No. Pyung 11-84243

The zoom lens disclosed in the cited patent (1) comprises, in order from an object side, a first lens group having a negative refractive power, and a second lens group having a positive refractive power. The second lens group is moved to perform zooming, and the first lens group is moved to compensate for the focus movement caused by the zooming. But, the first and second lens groups are moved along the optical axis to perform zooming, so the over-all length of the optical system is greatly varied during zooming. Therefore, the construction of the camera barrel is too complex, and it becomes difficult to realize a zoom ratio of at least 2× and particularly to realize miniaturization of the zoom lens.

The zoom lens disclosed in the cited patent (2) is a lens system of which the over-all length is not varied during zooming. The zoom lens comprises, in order from an object side, a first lens group having a negative refractive power that is fixed during zooming, a second lens group having a positive refractive power that is moved along the optical axis during zooming, and a third lens group having a positive refractive power. The second and third lens groups are moved towards the object side during zooming from the wide-angle position to the telephoto position. The over-all length of the optical system is required to be long enough so as to correct the performance at a wide angle, resulting in a large-sized optical system. Therefore, it becomes difficult to realize miniaturization of the zoom lens.

The zoom lens disclosed in the cited patent (3) is a three-group type zoom lens that includes a third lens group having a negative or positive refractive power on the image side of a second lens group to correct all kinds of aberrations, so as to enhance the zoom ratio and make the entire lens system compact in a two-group type zooming system. In this zoom lens, the first and second lens groups are moved along the optical axis to perform zooming, and the third lens group is fixed. But, the over-all length of the optical system is varied and the zoom ratio is at most 2×.

The zoom lens disclosed in the cited patent (4) comprises, in order from an object side, a first lens group having a negative refractive power, a second lens group having a positive refractive power, a third lens group having a negative refractive power, and a fourth lens group having a positive refractive power. The zoom lens has such a structure that the respective lens groups are moved during zooming, so the configuration of the camera barrel is too complex.

The zoom lens disclosed in the cited patent (5) comprises, in order from an object side, a first lens group having a negative refractive power, a second lens group having a positive refractive power, and a third lens group having a positive refractive power. During zooming, the distance between the first and second lens groups and the distance between the second and third lens groups are decreasing. In this structure, the second and third lens groups are getting closer to each other at the wide-angle position, so the focusing according to the distance from the object must be performed with the first or second lens group. The first and second lens groups have a much larger number of lenses than in the third lens group. The number of lenses to be moved during focusing is thus increased to increase the focusing error, and the moving part of the lens system is extremely large in volume. Therefore, it becomes difficult to realize miniaturization of the zoom lens.

SUMMARY OF THE INVENTION

It is an advantage of the present invention to provide a zoom lens that is a photographing optical system for cameras using an image pickup device, and that has high optical performance with a small number of lenses.

It is another advantage of the present invention to provide a low-cost zoom lens that readily replaces the constituent lenses of the optical system with plastic lenses.

It is still another advantage of the present invention to provide a zoom lens having good optical performance that shows telecentricity and well-compensated chromatic aberration.

In one aspect of the present invention, there is provided a zoom lens that includes, in order from an object side: a first lens group entirely having a negative refractive power, the first lens group including a first lens having a negative refractive power, and a second lens having a positive refractive power; a second lens group entirely having a positive refractive power, the second lens group including a third lens having a positive refractive power, and a fourth lens having a negative refractive power; and a third lens group entirely having a positive refractive power, the third lens group including a fifth lens having a positive refractive power. The zoom lens satisfies the following conditional expression:

$$-3.0 < \frac{f_1}{f_w} < -2.0$$

In the zoom lens, the second lens includes at least one aspheric surface and the second lens includes a plastic lens.

In another aspect of the present invention, there is provided a zoom lens that comprises, in order from an object side: a first lens group entirely having a negative refractive power, the first lens group including a first lens having a negative refractive power, and a second lens having a positive refractive power and at least one aspheric surface; a second lens group entirely having a positive refractive power, the second lens group including a third lens having a positive refractive power, and a fourth lens having a negative refractive power and at least one aspheric surface; and a third lens group entirely having a positive refractive power, the third lens group including a fifth lens having a positive refractive power and at least one aspheric surface. The zoom lens satisfies the following conditional expression:

$$-3.0 < \frac{f_1}{f_w} < -2.0$$

In the zoom lens, the lens having an aspheric surface in each lens group includes a plastic lens.

In the zoom lens according to the present invention, the first, second, and third lens groups are moved along an optical axis during zooming from the wide-angle position to a telephoto position.

The zoom lens further satisfies the following conditional expression(s):

$$0.8 < \frac{f_{g2}}{f_{g5}} < 1.0 \text{ and/or}$$

$$1.7 < \frac{f_2}{f_w} < 2.1.$$

The second and fourth lenses may have the same refractive index, and the first and third lenses may have the same refractive index.

In a further aspect of the present invention, there is provided a zoom lens that includes, in order from an object side: a first lens group entirely having a negative refractive power, the first lens group including a first lens having a negative refractive power a nd a concave surface on both sides thereof, and a second lens having a positive refractive power and a convex surface on the object side thereof; a second lens group entirely having a positive refractive power, the second lens group including a third lens having a positive refractive power, and a fourth lens having a negative refractive power and a convex meniscus surface on the object side thereof; and a third lens group entirely having a positive refractive power, the third lens group including at least one fifth lens having a positive refractive power. During zooming from a wide-angle position to a telephoto position, the distance between the first and second lens groups is reduced, and the distance between the second and third lens groups is increased. The zoom lens satisfies the following conditional expression:

$$0.5 \leq \frac{f_{1P}}{|f_1|} \leq 1.0$$

(where $f_I$ denotes the focal length of the first lens group; and $f_{IP}$ denotes the focal length of a lens having a positive refractive power among the lenses of the first lens group).

In still another aspect of the present invention, there is provided a zoom lens that comprises, in order from an object side: a first lens group entirely having a negative refractive power, the first lens group including a first lens having a negative refractive power and a concave surface on both sides thereof, and a second lens having a positive refractive power and a convex surface on the object side thereof; a second lens group entirely having a positive refractive power, the second lens group including a third lens having a positive refractive power, and a fourth lens having a negative refractive power and a convex meniscus surface on the object side thereof; and a third lens group entirely having a positive refractive power, the third lens group including at least one fifth lens having a positive refractive power. During zooming from a wide-angle position to a telephoto position, the distance between the first and second lens groups is reduced, and the distance between the second and third lens groups is increased. The zoom lens satisfies the following conditional expression:

$$1.0 \leq \frac{f_{II}}{\sqrt{f_w f_T}} \leq 1.5$$

(where $f_{II}$ denotes the focal length of the second lens group; $f_W$ denotes the total focal length at the wide-angle position; and $f_T$ denotes the total focal length at the telephoto position).

The zoom lens further satisfies the following conditional expression:

$$1.0 \leq \frac{L_{II}}{\sqrt{f_w f_T}} \leq 1.5$$

(where $L_{II}$ denotes the displacement of the second lens group from the wide-angle position to the telephoto position)
or $$1.2 \leq \frac{|f_1|}{\sqrt{f_w f_T}} \leq 1.8 \text{ or}$$

$$1.5 \leq \frac{f_{III}}{\sqrt{f_w f_T}} \leq 3.0$$

(where $f_{III}$ denotes the focal length of the third lens group).

During zooming from the wide-angle position to the telephoto position, the second lens group is moved along an optical axis to perform the zooming, and the first and third lens groups are moved in association with the second lens group to compensate for a movement of the focus position caused by the zooming.

BRIEF DESCRIPTION OF THE DRAWINGS

The accompanying drawings, which are incorporated in and constitute a part of the specification, illustrate an embodiment of the invention, and, together with the description, serve to explain the principles of the invention.

FIG. 1 illustrates the position-based configuration of a zoom lens according to a first example of a first embodiment of the present invention.

FIGS. 8a and 8b are graphs showing the aberrations at the wide-angle position and the telephoto position of the zoom lens according to the first example of the second embodiment of the present invention, respectively.

FIGS. 10a and 10b are graphs showing the aberrations at the wide-angle position and the telephoto position of the zoom lens according to the second example of the second embodiment of the present invention, respectively.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

First, the description will be given as to the embodiments of the present invention to provide a zoom lens that has high optical performance with a small number of lenses as a photographing optical system of cameras using an image pickup device.

Figure 3:
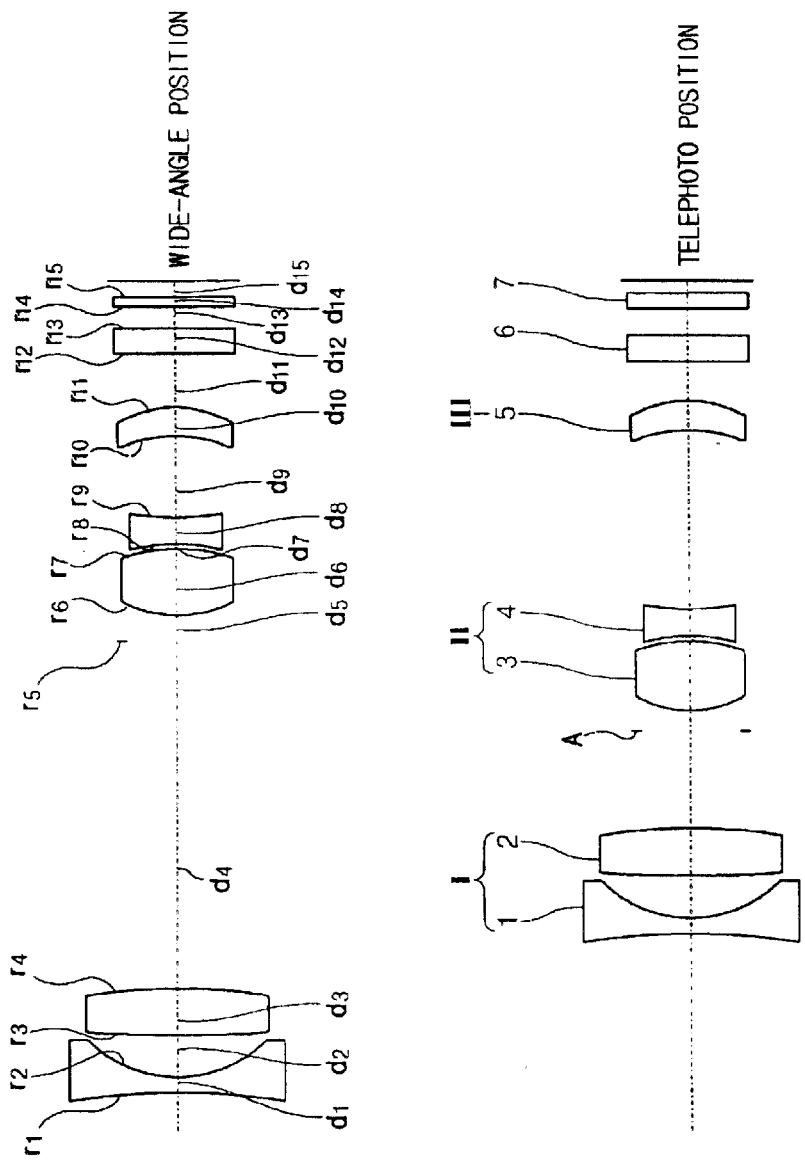
FIG. 3 illustrates the position-based configuration of a zoom lens according to a second example of the first embodiment of the present invention.
Figure 5:
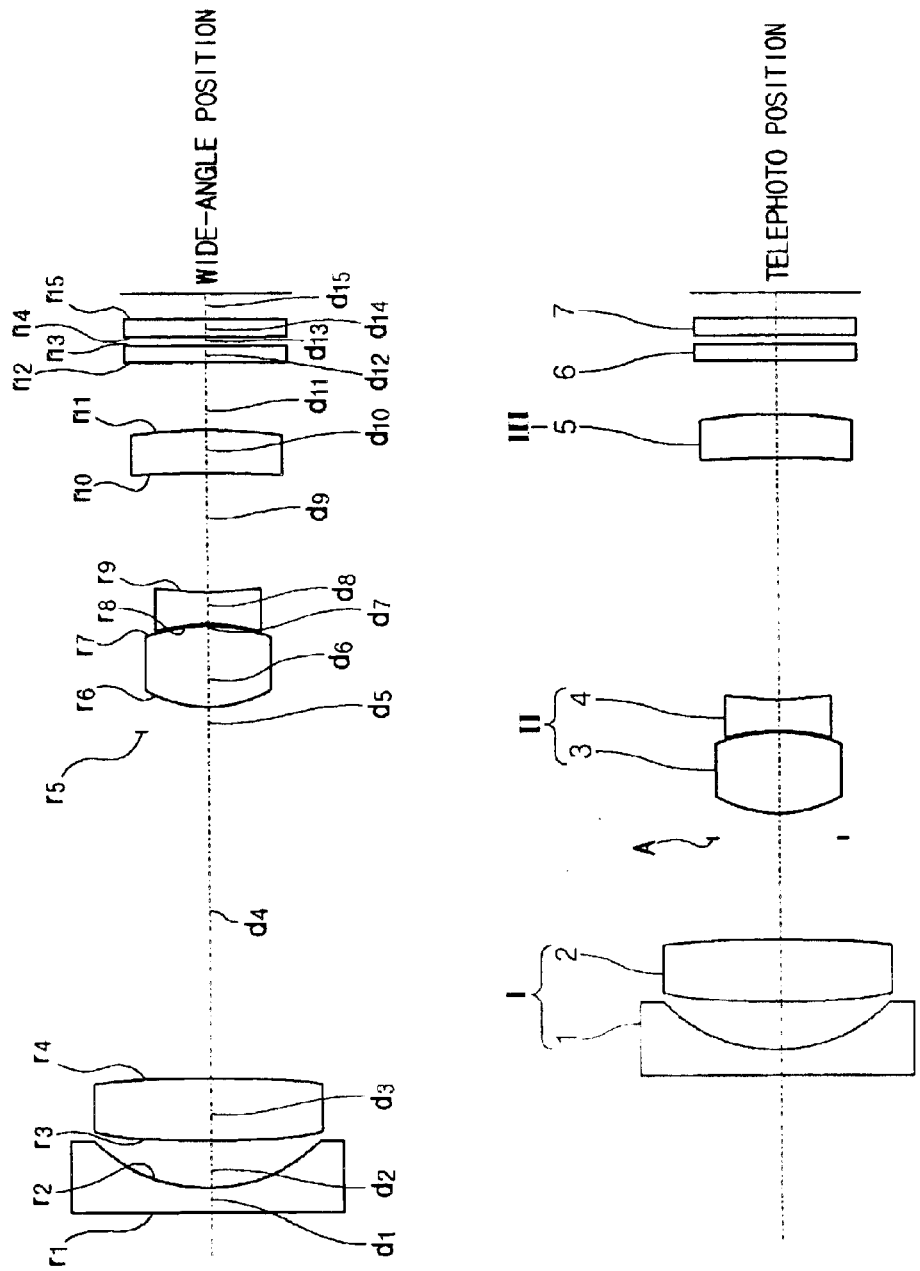
FIG. 5 illustrates the position-based configuration of a zoom lens according to a third example of the first embodiment of the present invention.

FIGS. 1, 3, and 5 illustrate the position-based configuration of the zoom lens according to a first embodiment of the present invention.

As shown in FIGS. 1, 3, and 5, the zoom lens according to the first embodiment of the present invention includes, in order from an object side, a first lens group I having a negative refractive power, a second lens group II having a positive refractive power, and a third lens group III having a positive refractive power, an iris diaphragm A being located between the first and second lens groups I and II.

The first lens group I includes, in order from an object side, a first lens 1 having a negative refractive power, and a second lens 2 having a positive refractive power. At least one of these lenses may be an aspheric lens.

The second lens group II includes, in order from an object side, a third lens 3 having a positive refractive power, and a fourth lens 4 having a negative refractive power. At least one of these lenses may be an aspheric lens.

The third lens group III includes at least one lens having a positive refractive power. One of those lenses may be an aspheric lens. In the first embodiment, the third lens group III includes a fifth lens 5 having a positive refractive power, and the fifth lens 5 is an aspheric lens.

In the zoom lens having such an NPP structure according to the first embodiment of the present invention, each lens group moves when zooming from the wide-angle position towards the telephoto position, as illustrated in FIGS. 1, 3, and 5. Here, the zooming reduces the distance between the first and second lens groups I and II and increases the distance between the second and third lens groups II and III. More specifically, during the zooming from the wide-angle position to the telephoto position, the first lens group I is moved from the object side to the image side, the second lens group II is moved from the image side to the object side, and the third lens group III is moved from the object side to the image side.

The following description describes the configuration of each lens of the first, second, and third embodiments of the present invention in further detail.

The operation of the zoom lens according to the first embodiment of the present invention having the aforementioned structure is described as follows.

In the first embodiment of the present invention, aspheric lenses are adequately used to realize a high quality zoom lens of a three-group type with about 5 lenses. The respective lenses, particularly the aspheric lenses, are properly arranged to be easily replaced with plastic lenses, thereby readily realizing a more inexpensive zoom lens.

As described above, the zoom lens according to the first embodiment of the present invention comprises the first, second, and third lens groups I, II, and III having an NPP refractive power arrangement. In the zoom lens of this structure, the correction of aberrations becomes difficult when the first lens group has a strong refractive power. Hence, in the first embodiment of the present invention, aspheric lenses are properly arranged in the first lens group to facilitate the correction of aberrations. Particularly, in the first lens group I comprising, in order from the object side, the first lens 1 having a negative refractive power and the second lens 2 having a positive refractive power, the second lens 2 having a positive refractive power has an aspheric surface for the correction of aberrations.

By replacing aspheric lenses having a positive refractive power with plastic lenses, manufacture and production can be facilitated with an enhanced optical performance relative to the replacement with plastic lenses of aspheric lenses having a negative refractive power (which affect the appearance quality). Namely, injection molding is extremely difficult to carry out when the first lens 1, which has a center that is thicker than the margin by more than a predetermined ratio, has an aspheric surface. Contrarily, injection molding is more facilitated when the lens having the same profile as the second lens 2 has an aspheric surface. The second lens 2, easily formed by injection molding, can be readily replaced with a plastic lens to enhance productivity.

In the zoom lens according to the embodiment of the present invention, the positive lens (the third lens) having a strong refractive power in the second lens group II is arranged close to the object side and the negative lens (the fourth lens) having a relatively weak refractive power is positioned after the positive lens, thereby making it easier to correct the spherical aberration and astigmatism.

The third lens group comprises one lens to simplify the structure of the system and to readily realize miniaturization and weight savings.

The functions of the individual lenses in the zoom lens according to the first embodiment of the present invention are described as follows. The first lens 1 reduces the angle of view of an incident light beam, and the second lens 2 enhances the correction effect of aberrations. The third lens 3 and fourth lens 4, arranged adjacent to the iris diaphragm A in the second lens group II, are used to correct spherical aberration and coma. Particularly, the fourth lens 4 has at least one aspheric surface, so as to realize a well-balanced correction of the spherical aberration and coma. The third lens group III comprises one lens (the fifth lens) having a negative refractive power to correct coma and astigmatism and to perform a focusing function. The first lens group I is also used to correct chromatic aberration.

The zoom lens according to the first embodiment of the present invention satisfies the following conditional expression:

$$-3.0 < \frac{f_1}{f_w} < -2.0 \qquad \text{[Conditional Expression 1]}$$

where $f_1$ denotes the focal length of the first lens group I; and $f_w$ denotes the total focal length at the wide-angle position.

The Conditional Expression 1 defines the ratio of the focal length of the first lens 1 to the total focal length at the wide-angle position, so that the distance between the lenses (negative and positive lenses) constituting the first lens group I is decreased, thereby reducing the volume of the first lens group I.

When the embodied value falls below the lower limit of the Conditional Expression 1, the focal length of the first lens group I is incremented, thereby increasing the distance between the lenses constituting the first lens group I and hence the volume of the first lens group I. Therefore, it becomes difficult to realize the miniaturization of the zoom lens.

On the other hand, when the embodied value exceeds the upper limit of the Conditional Expression 1, the refractive power of the second lens 2 of the first lens group I increases relative to that of the first lens 1, and it becomes difficult to realize the correction of aberrations.

The zoom lens according to the first embodiment of the present invention also satisfies the following conditional expression:

$$1.7 < \frac{f_2}{f_w} < 2.1 \qquad \text{[Conditional Expression 2]}$$

where $f_2$ denotes the focal length of the second lens group II.

The Conditional Expression 2 defines the ratio of the focal length of the second lens 2 to the total focal length of the zoom lens. When the embodied value exceeds the upper limit of the Conditional Expression 2, the refractive power of the second lens group II is incremented, thereby increasing the chromatic aberration caused by the first lens group I and the third lens 3 of the second lens group II.

On the other hand, when the embodied value falls below the lower limit of the Conditional Expression 2, the refractive power of the fourth lens 4 of the second lens group II is relatively increased. Thus, when a plastic lens is used as the fourth lens 4 to embody a low-cost zoom lens, the zoom lens is extremely sensitive to the variations of the environment caused by temperature and humidity, thereby deteriorating the total performance of the optical system.

The zoom lens according to the first embodiment of the present invention also satisfies the following conditional expression:

$$0.8 < \frac{f_{g2}}{f_{g5}} < 1.0 \qquad \text{[Conditional Expression 3]}$$

where $f_{g2}$ denotes the focal length of the second lens 2; and $f_{g5}$ denotes the focal length of the fifth lens 5.

The Conditional Expression 3 defines the ratio of the focal length of the second lens 2 to the focal length of the fifth lens 5 when the two lenses are aspheric lenses comprised of plastic lenses, so that the variations of the environment should not affect the zoom lens. Particularly, the Conditional Expression 3 defines the ratio of the focal length of the second lens 2 to the focal length of the fifth lens 5 in consideration of the correction ability of the optical system based on the variations of temperature and humidity. If the Conditional Expression 3 is not satisfied, the lens focus will change according to the variations of the environment such as temperature and humidity, thereby deteriorating the performance of the optical system.

The first, second, and third embodiments of the present invention realized to satisfy the aforementioned conditions (Conditional Expressions 1, 2, and 3) are described below.

In the description, "f" is the focal length, "ri (i=1 to 15)" is the radius of curvature of a lens face, "di (i=1 to 15)" is the thickness of a lens or the distance between lenses, "Nd" is the refractive index, and "v" is the variance. Here, the unit of length is "mm (millimeter)".

For the zoom lens according to a first example of the first embodiment of the present invention, the focal length f is 4.85 mm to 14.56 mm between the wide-angle position and the telephoto position, with the angle of view 2ω being 63.3° to 21.1°, the angle of view 2ω at the middle position in particular being 31.7°, and the zoom ratio being about 3.00.

FIG. 1 shows the configuration of the zoom lens according to the first example of the first embodiment of the present invention that has the noted characteristics. The zoom lens comprises, as shown in FIG. 1, a first lens group I that includes a first lens 1 having a negative refractive power and a concave surface on both sides, and a second lens 2 having a positive refractive power and a convex surface on both sides; a second lens group II that includes a third lens 3 having a positive refractive power and a convex surface on both sides, and a fourth lens 4 having a negative refractive power and a concave surface on both sides; and a third lens group III that includes a fifth lens 5 having a positive refractive power and a convex meniscus surface on the image side. The zoom lens also includes, sequentially on the image side of the fifth lens 5, an optical filter 6, and a cover glass 7 used to protect the entrance of foreign materials to the image pickup device.

Table 1 presents embodied values associated with the respective constituent lenses of the zoom lens according to the first example of the first embodiment of the present invention.

TABLE 1

| Face Number | Radius of Curvature (r) | Thickness, Distance (d) | Refractive Index (Nd) | Variance (v) |
|---|---|---|---|---|
| 1 | −38.789 | 0.80 | 1.63135 | 61.4 |
| 2 | 5.449 | 1.56 | | |
| *3 | 16.102 | 1.82 | 1.68400 | 31.3 |
| *4 | 4952.316 | D1 | | |
| 5 | ∞ | 0.80 | | |
| 6 | 4.690 | 3.30 | 1.61369 | 60.7 |
| 7 | −7.711 | 0.10 | | |
| *8 | −8.291 | 1.25 | 1.68400 | 31.3 |
| *9 | 13.609 | D2 | | |
| *10 | −5.897 | 1.43 | 1.58303 | 59.0 |
| *11 | −4.579 | D3 | | |
| 12 | ∞ | 1.13 | 1.51680 | 64.2 |
| 13 | ∞ | 1.00 | | |
| 14 | ∞ | 0.50 | 1.51680 | 64.2 |
| 15 | ∞ | 0.80 | | |

As can be seen from Table 1, the refractive index $N_{d2}$ of the second lens 2 having an aspheric surface is equal to the refractive index $N_{d4}$ of the fourth lens 4 in the first example of the first embodiment.

The symbol "*" indicates an aspheric surface. Aspheric surface coefficients can be expressed by the following equation:

$$z = \frac{ch^2}{1 + \sqrt{1 - (1+k)c^2h^2}} + A_4 h^4 + A_6 h^6 + A_8 h^8 + A_{10} h^{10}$$ [Equation 1]

where z is the distance from the vertical plane on the vertex of the aspheric surface with respect to the coordinates on the aspheric surface having a height h from the central optical axis; c is the lens curvature on the vertex of the aspheric surface; k is the conical constant; and $A_4$, $A_6$, $A_8$, and $A_{410}$ are aspheric surface coefficients.

The aspheric surface coefficients according to the first example of the first embodiment of the present invention as determined by the Equation 1 are presented in Table 2. The second lens 1 of the first lens group I, the fourth lens 4 of the second lens group II, and the fifth lens 5 of the third lens group III have an aspheric surface on both sides.

TABLE 2

| | Aspheric Surface Coefficients of Third Face | Aspheric Surface Coefficients of Fourth Face | Aspheric Surface Coefficients of Eighth Face |
|---|---|---|---|
| K | 9.929459 | −0.123493E + 28 | 1.034274 |
| $A_4$ | −0.476551E − 04 | −0.302111E − 03 | −0.377288E − 03 |
| $A_6$ | −0.171517E − 04 | −0.160862E − 04 | 0.130637E − 04 |
| $A_8$ | 0.152764E − 05 | 0.135042E − 05 | −0.610980E − 07 |
| $A_{10}$ | −0.503541E − 07 | −0.478513E − 07 | −0.186447E − 06 |

| | Aspheric Surface Coefficients of Ninth Face | Aspheric Surface Coefficients of Tenth Face | Aspheric Surface Coefficients of Eleventh Face |
|---|---|---|---|
| K | 26.839510 | −0.362413 | −4.85690 |
| $A_4$ | 0.113742E − 02 | −0.142794E − 03 | −0.444994E − 02 |
| $A_6$ | 0.711799E − 06 | 0.195844E − 04 | 0.358815E − 03 |
| $A_8$ | 0.185091E − 04 | 0.384404E − 04 | −0.246853E − 05 |
| $A_{10}$ | −0.417753E − 05 | −0.194193E − 05 | 0.167076E − 06 |

During zooming from the wide-angle position to the telephoto position, the distance D1 between the second lens 2 and the iris diaphragm A, the distance D2 between the fourth lens 4 and the fifth lens 5, and the distance D3 between the fifth lens 5 and the optical filter 6 are changed. The variations of the distances are presented in Table 3.

TABLE 3

| Face No. | Wide-angle position | Middle position | Telephoto position |
|---|---|---|---|
| D1 | 17.00 | 6.20 | 2.50 |
| D2 | 4.20 | 9.21 | 13.82 |
| D3 | 2.59 | 2.10 | 1.90 |

Figure 2A:
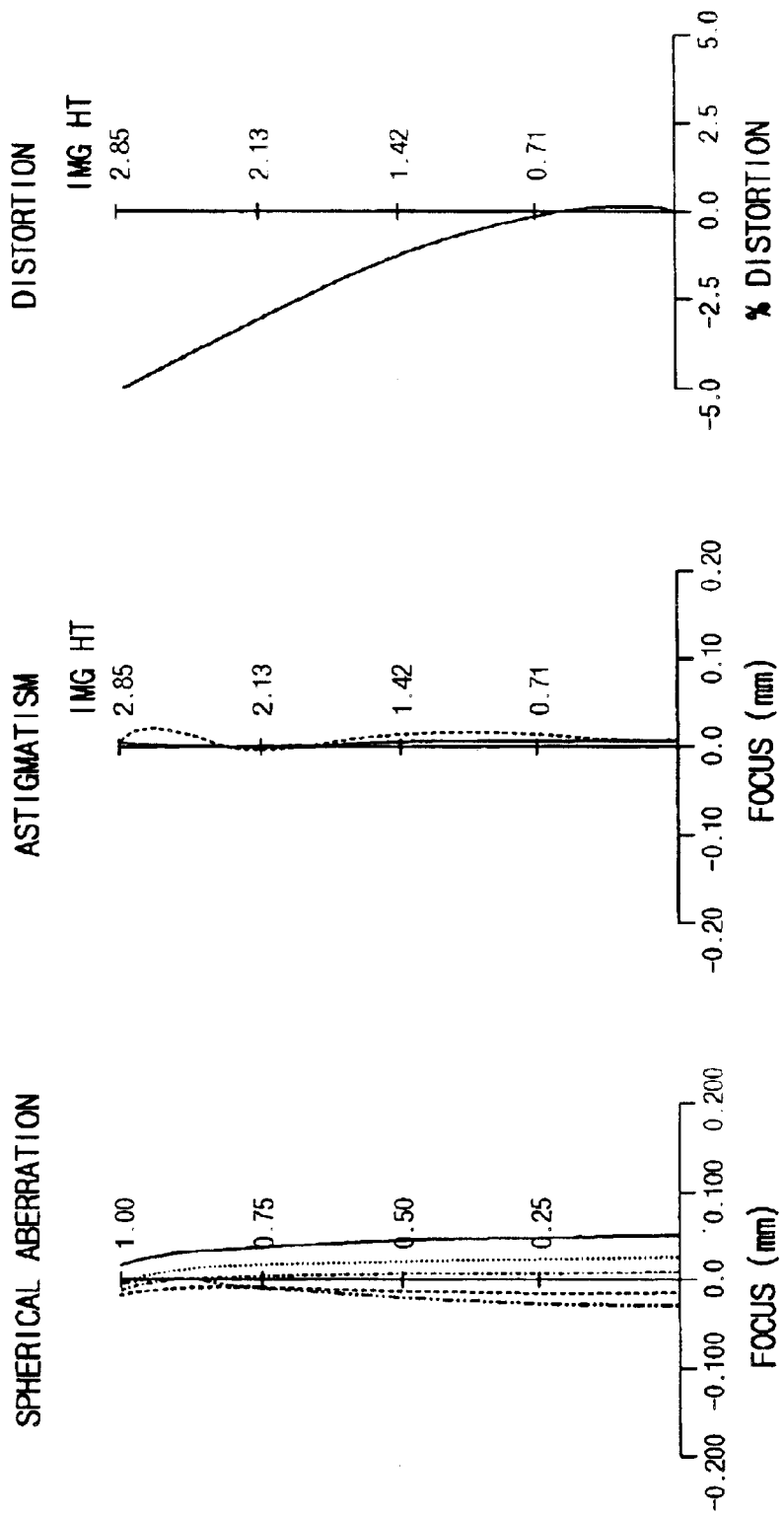
FIGS. 2a and 2b are graphs showing the aberrations at the wide-angle position and the telephoto position of the zoom lens according to the first example of the first embodiment of the present invention, respectively.
Figure 2B:
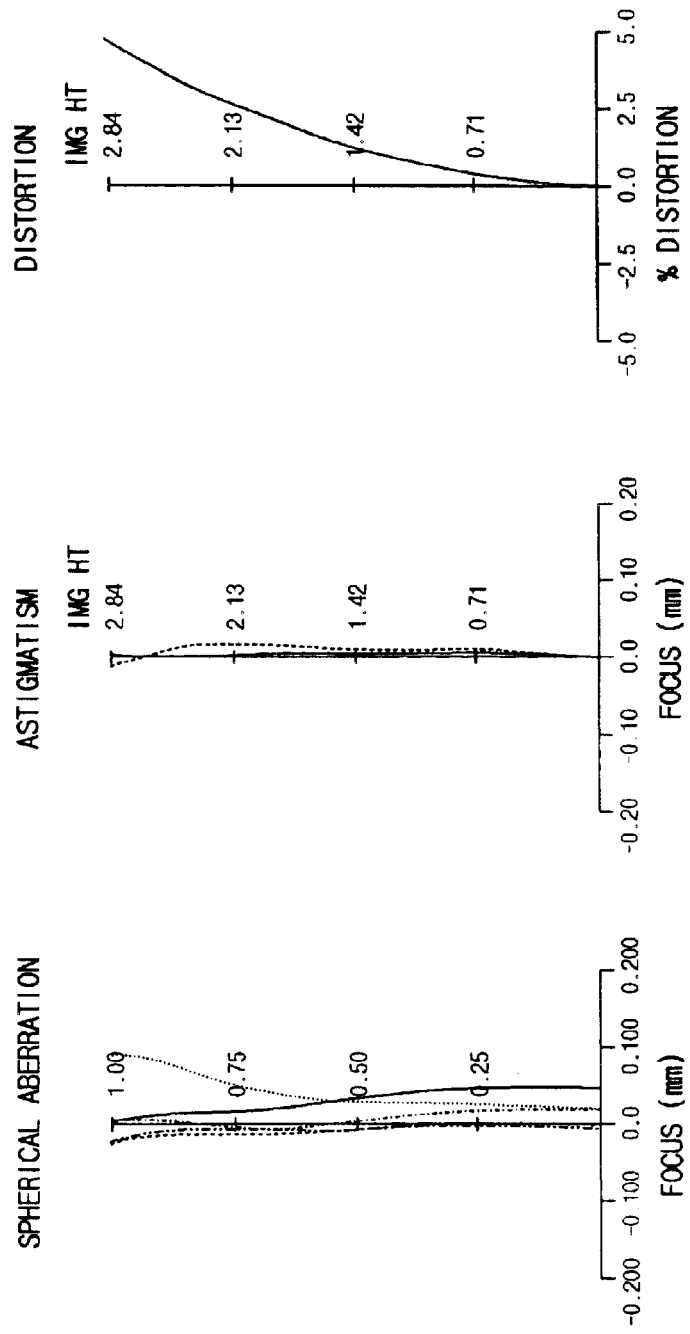

FIGS. 2a and 2b show the aberrations at the wide-angle position and the telephoto position of the zoom lens according to the first example of the first embodiment of the present invention, respectively.

For a zoom lens according to a second example of the first embodiment of the present invention, the focal length f is 4.90 mm to 9.91 mm between the wide-angle position and the telephoto position, the angle of view 2ω being 62.4° to 31.3° and particularly 40.2° at the middle position, the zoom ratio being about 2.02.

FIG. 3 shows the configuration of the zoom lens according to the second example of the first embodiment of the present invention that has: the noted characteristics. The zoom lens, as shown in FIG. 3, has the same configuration as previously described in regard to the first example. Unlike the first example, the second lens 2, the fourth lens 4, and the fifth lens 5 that have an aspheric surface are plastic lenses.

Table 4 presents embodied values associated with the respective constituent lenses of the zoom lens according to the second example of the first embodiment of the present invention.

TABLE 4

| Face Number | Radius of Curvature (r) | Thickness, Distance (d) | Refractive Index (Nd) | Variance (v) |
|---|---|---|---|---|
| 1 | −45.441 | 0.80 | 1.62041 | 60.3 |
| 2 | 5.827 | 1.55 | | |
| *3 | 59.089 | 2.40 | 1.60700 | 27.6 |
| *4 | −26.514 | D1 | | |
| 5 | ∞ | 1.10 | | |
| 6 | 4.815 | 3.30 | 1.60311 | 60.7 |
| 7 | −10.018 | 0.23 | | |
| 8 | −8.713 | 1.20 | 1.60700 | 27.6 |
| *9 | 15.985 | D2 | | |
| *10 | −6.700 | 1.22 | 1.52470 | 56.2 |
| *11 | −5.029 | D3 | | |
| 12 | ∞ | 1.13 | 1.51680 | 64.2 |
| 13 | ∞ | 1.33 | | |
| 14 | ∞ | 0.80 | 1.51680 | 64.2 |
| 15 | ∞ | 0.53 | | |

As can be seen from Table 4, the refractive index $N_{d2}$ of the second lens 2 having an aspheric surface is equal to the refractive index $N_{d4}$ of the fourth lens 4 also in the second example of the first embodiment.

The symbol "*" indicates an aspheric surface.

The respective aspheric surface coefficients according to the second example of the first embodiment of the present invention are presented in Table 5. In the second example of the first embodiment of the present invention, both sides of the second lens 2 of the first lens group I, the image side of the fourth lens 4 of the second lens group II, and both sides of the fifth lens 5 of the third lens group III have an aspheric surface.

TABLE 5

| | Aspheric Surface Coefficients of Third Face | Aspheric Surface Coefficients of Fourth Face | Aspheric Surface Coefficients of Ninth Face |
|---|---|---|---|
| K | 165.74698 | −95.034438 | 43.188524 |
| $A_4$ | 0.715252E − 03 | −0.384874E − 03 | 0.175293E − 02 |
| $A_6$ | −0.259764E − 04 | 0.676731E − 05 | −0.241048E − 03 |
| $A_8$ | 0.155316E − 05 | −0.185846E − 06 | 0.851421E − 04 |
| $A_{10}$ | −0.474677E − 07 | −0.162344E − 07 | −0.133531E − 04 |

| | Aspheric Surface Coefficients of Tenth Face | Aspheric Surface Coefficients of Eleventh Face |
|---|---|---|
| K | 2.300740 | −8.036806 |
| $A_4$ | −0.117897E − 02 | −0.785501E − 02 |
| $A_6$ | −0.161996E − 03 | 0.586780E − 03 |
| $A_8$ | 0.803407E − 05 | −0.590760E − 04 |
| $A_{10}$ | 0.205270E − 05 | 0.336693E − 05 |

During zooming from the wide-angle position to the telephoto position, the distance D1 between the second lens 2 and the iris diaphragm A, the distance D2 between the fourth lens 4 and the fifth lens 5, and the distance D3 between the fifth lens 5 and the optical filter 6 are changed. The variations of the distances are presented in Table 6.

TABLE 6

| Face No. | Wide-angle position | Middle position | Telephoto position |
|---|---|---|---|
| D1 | 17.01 | 8.01 | 5.04 |
| D2 | 4.15 | 6.05 | 8.79 |
| D3 | 2.30 | 2.88 | 2.14 |

Figure 4A:
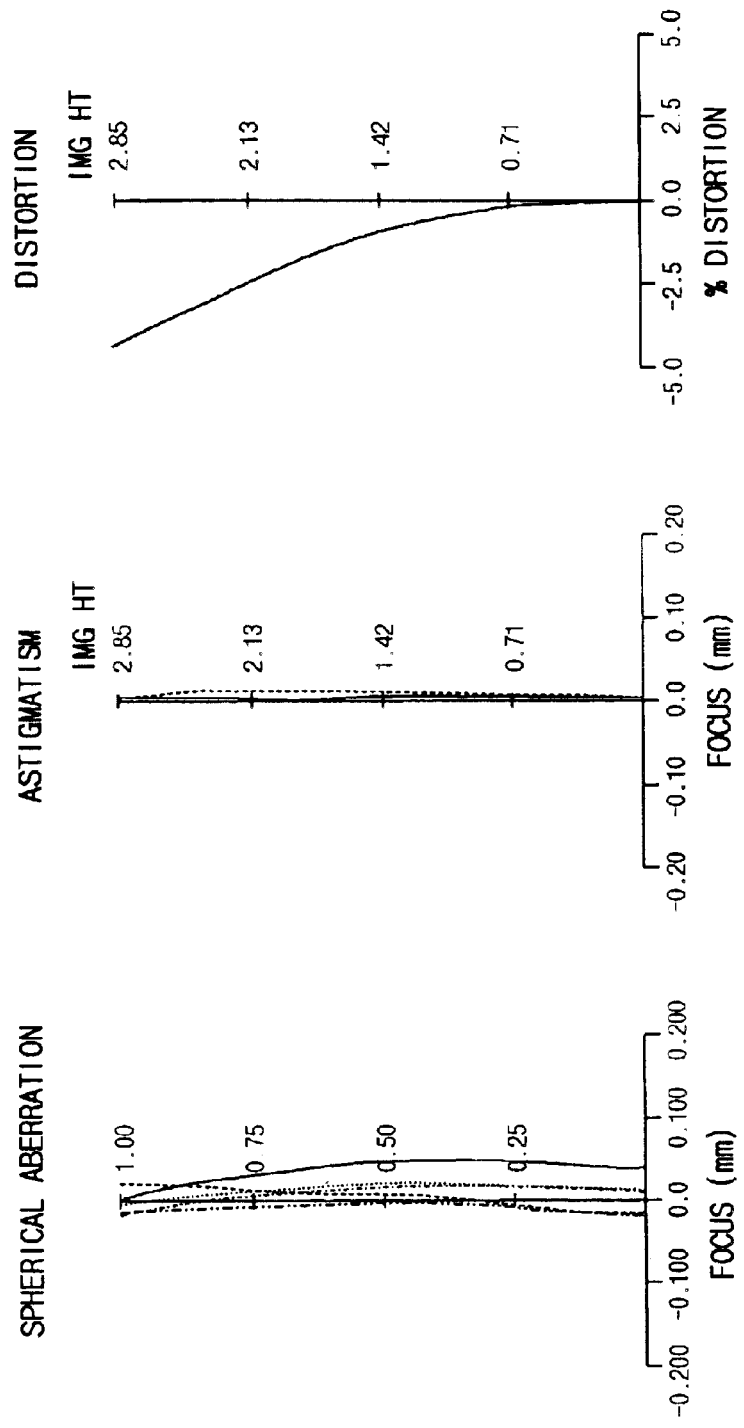
FIGS. 4a and 4b are graphs showing the aberrations at the wide-angle position and the telephoto position of the zoom lens according to the second example of the first embodiment of the present invention, respectively.
Figure 4B:
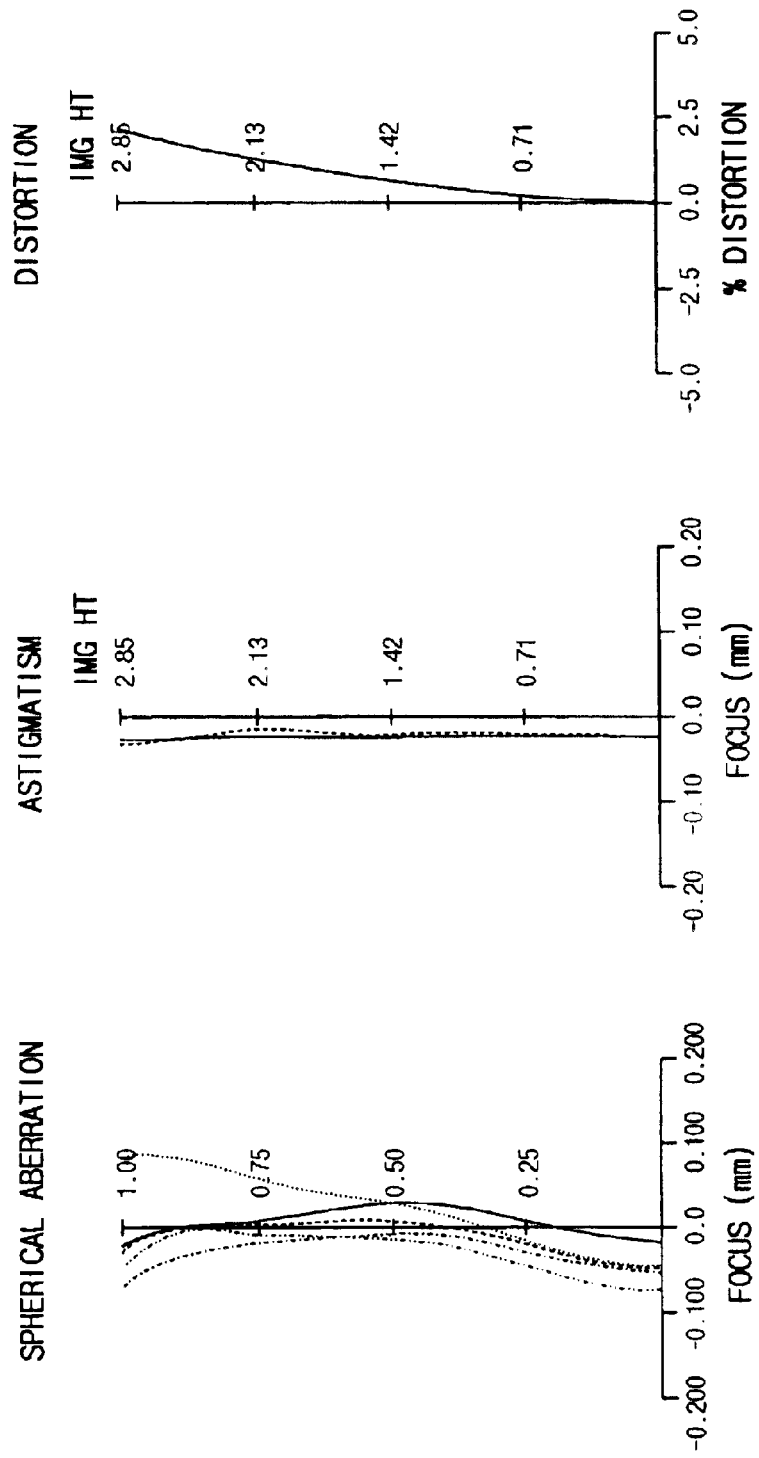

FIGS. 4a and 4b show the aberrations at the wide-angle position and the telephoto position of the zoom lens according to the second example of the first embodiment of the present invention, respectively.

For a zoom lens according to a third example of the first embodiment of the present invention, the focal length f is 4.20 mm to 7.80 mm between the wide-angle position and the telephoto position, the angle of view 2ω being 57.9° to 31.4° and particularly 40.8° at the middle position, the zoom ratio being about 1.86.

FIG. 5 shows the configuration of the zoom lens according to the third example of the first embodiment of the present invention that has the noted characteristics. The zoom lens, as shown in FIG. 5, has the same structure as the first example. Unlike the first example, the second lens 2, the fourth lens 4, and the fifth lens 5 that have an aspheric surface are plastic lenses.

Table 7 presents embodied values associated with the respective constituent lenses of the zoom lens according to the third example of the first embodiment of the present invention.

TABLE 7

| Face Number | Radius of Curvature (r) | Thickness, Distance (d) | Refractive Index (Nd) | Variance (v) |
|---|---|---|---|---|
| 1 | 241.656 | 0.70 | 1.62041 | 61.4 |
| 2 | 4.005 | 1.31 | | |
| *3 | 19.908 | 1.77 | 1.60700 | 27.6 |
| *4 | −48.877 | D1 | | |
| 5 | ∞ | 0.60 | | |
| 6 | 3.461 | 2.28 | 1.62041 | 61.4 |
| 7 | −8.011 | 0.105 | | |
| *8 | −7.354 | 0.83 | 1.60700 | 27.6 |
| *9 | 9.560 | D2 | | |
| *10 | −115.845 | 1.24 | 1.52470 | 56.2 |
| *11 | −12.632 | D3 | | |
| 12 | ∞ | 0.48 | 1.51680 | 64.2 |
| 13 | ∞ | 0.20 | | |
| 14 | ∞ | 0.50 | 1.51680 | 64.2 |
| 15 | ∞ | 0.80 | | |

As can be seen from Table 7, the refractive index $N_{d2}$ of the second lens 2 having an aspheric surface is equal to the refractive index $N_{d4}$ of the fourth lens 4 also in the third example of the first embodiment.

The symbol "*" indicates an aspheric surface.

The respective aspheric surface coefficients according to the third example of the first embodiment of the present invention are presented in Table 8. Both sides of the second lens 2 of the first lens group I, both sides of the fourth lens 4 of the second lens group II, and both sides of the fifth lens 5 of the third lens group III have an aspheric surface.

TABLE 8

| | Aspheric Surface Coefficients of Third Face | Aspheric Surface Coefficients of Fourth Face | Aspheric Surface Coefficients of Eighth Face |
|---|---|---|---|
| K | 11.760782 | −6.633252 | −1.840994 |
| $A_4$ | 0.993564E−03 | −0.954146E−04 | 0.755901E−03 |
| $A_6$ | −0.141087E−03 | −0.178966E−03 | −0.168083E−03 |
| $A_8$ | 0.157424E−04 | 0.175543E−04 | −0.637654E−04 |
| $A_{10}$ | −0.751692E−06 | −0.110486E−05 | 0.135175E−04 |

| | Aspheric Surface Coefficients of Ninth Face | Aspheric Surface Coefficients of Tenth Face | Aspheric Surface Coefficients of Eleventh Face |
|---|---|---|---|
| K | 27.356347 | −7730.317375 | −159.156305 |
| $A_4$ | 0.564702E−02 | 0.205234E−03 | −0.501327E−02 |
| $A_6$ | −0.256636E−03 | −0.726223E−03 | 0.135939E−02 |
| $A_8$ | 0.103222E−03 | 0.125951E−04 | −0.359596E−03 |
| $A_{10}$ | −0.879959E−04 | 0.125507E−04 | 0.373875E−04 |

During zooming from the wide-angle position to the telephoto position, the distance D1 between the second lens 2 and the iris diaphragm A, the distance D2 between the fourth lens 4 and the fifth lens 5, and the distance D3 between the fifth lens 5 and the optical filter 6 are changed. The variations of the distances are presented in Table 9.

TABLE 9

| Face No. | Wide-angle position | Middle position | Telephoto position |
|---|---|---|---|
| D1 | 9.60 | 5.00 | 2.70 |
| D2 | 3.20 | 4.65 | 6.60 |
| D3 | 1.90 | 1.94 | 1.50 |

Figure 6A:
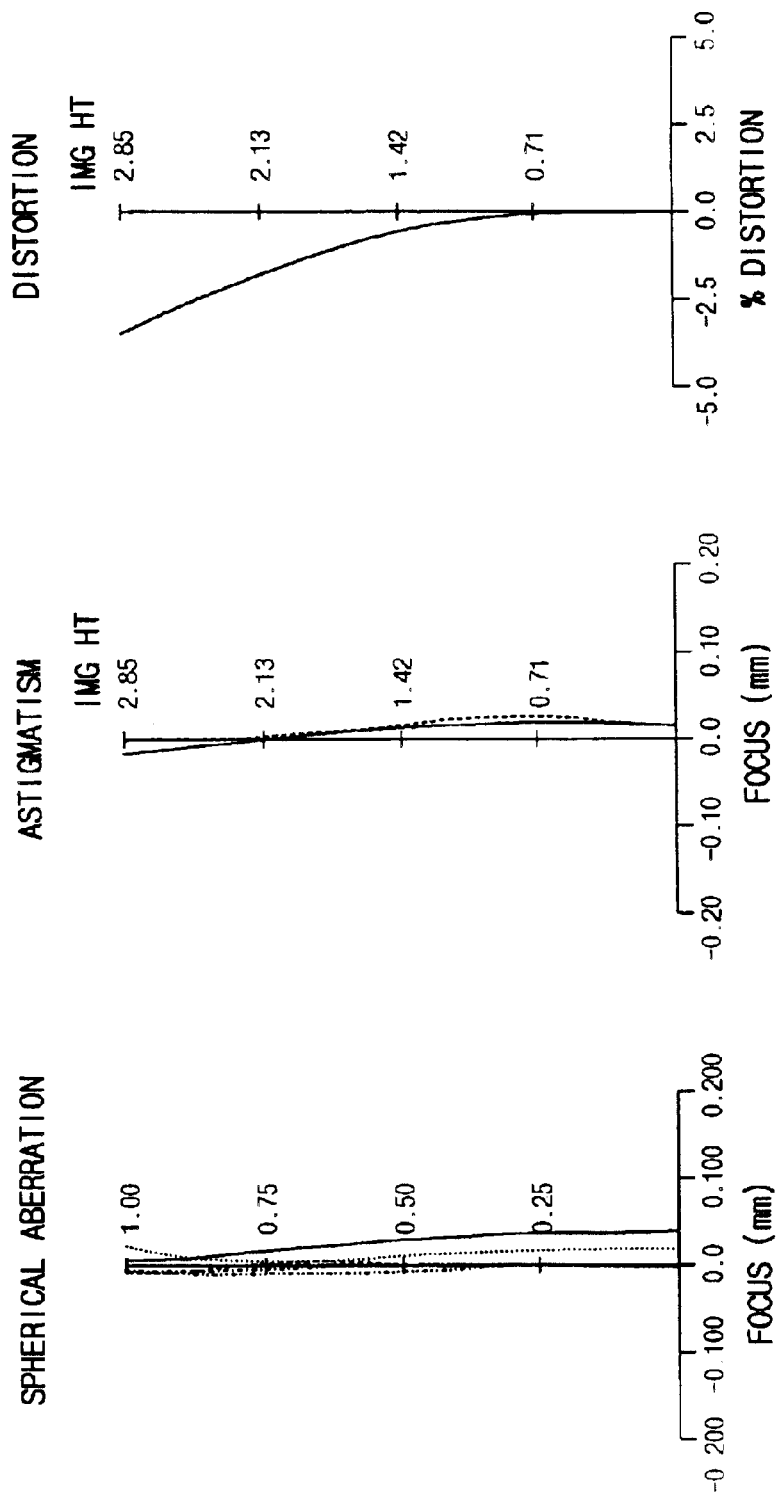
FIGS. 6a and 6b are graphs showing the aberrations at the wide-angle position and the telephoto position of the zoom lens according to the third example of the first embodiment of the present invention, respectively.
Figure 6B:
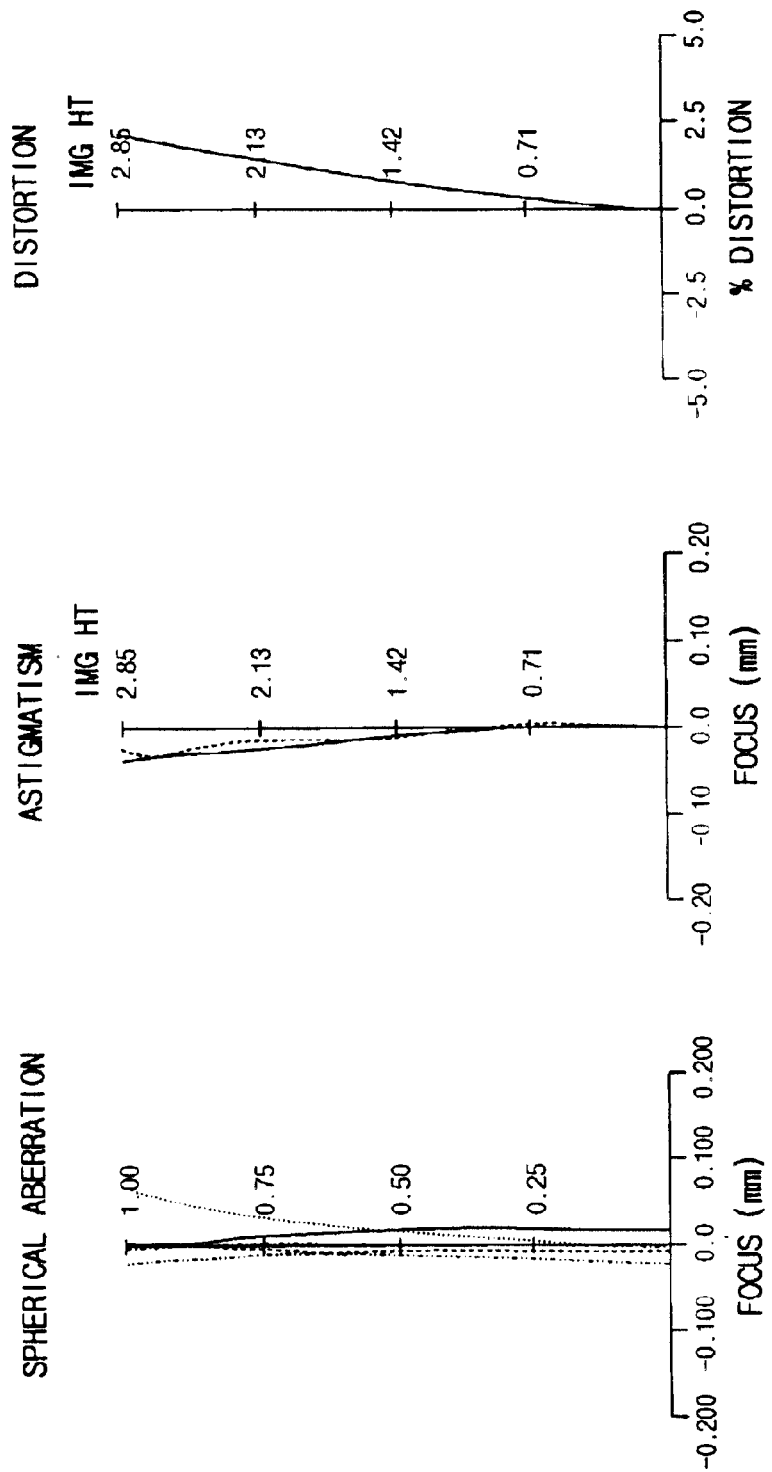

FIGS. 6a and 6b show the aberrations at the wide-angle position and the telephoto position of the zoom lens according to the third example of the first embodiment of the present invention, respectively.

The zoom lenses according to the examples of the first embodiment of the present invention that have the above-embodied values satisfy the aforementioned conditions (Conditional Expressions 1, 2, and 3), and the embodied values of the respective conditional expressions are presented in Table 10.

TABLE 10

|  | Embodiment 1 | Embodiment 2 | Embodiment 3 |
|---|---|---|---|
| $f_1/f_W$ | −2.52168 | −2.62911 | −2.4021 |
| $f_2/f_W$ | 2.073207 | 2.087457 | 1.734245 |
| $f_{g2}/f_{g5}$ | 0.93846 | 0.987503 | 0.869662 |

Next, the description will be given as to the zoom lens according to a second embodiment of the present invention.

Figure 7:
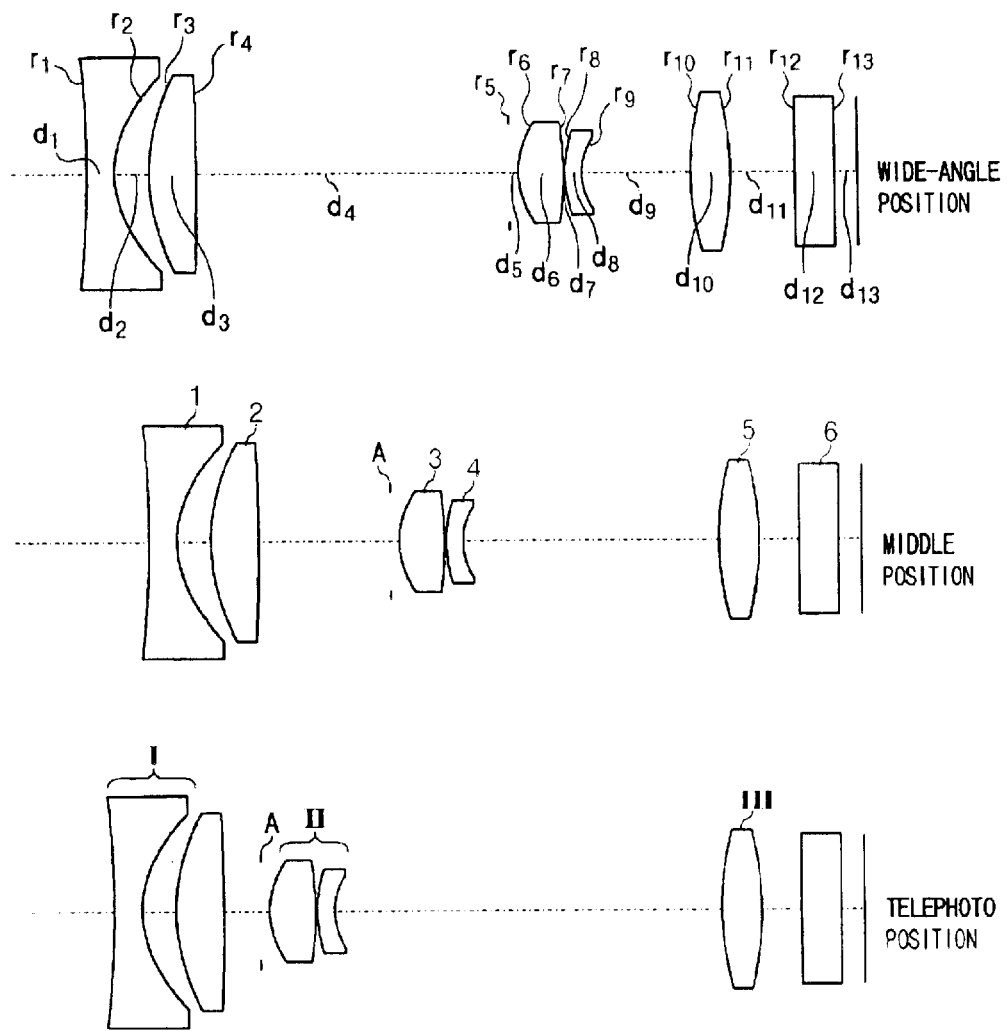
FIG. 7 illustrates the position-based configuration of a zoom lens according to a first example of a second embodiment of the present invention.
Figure 9:
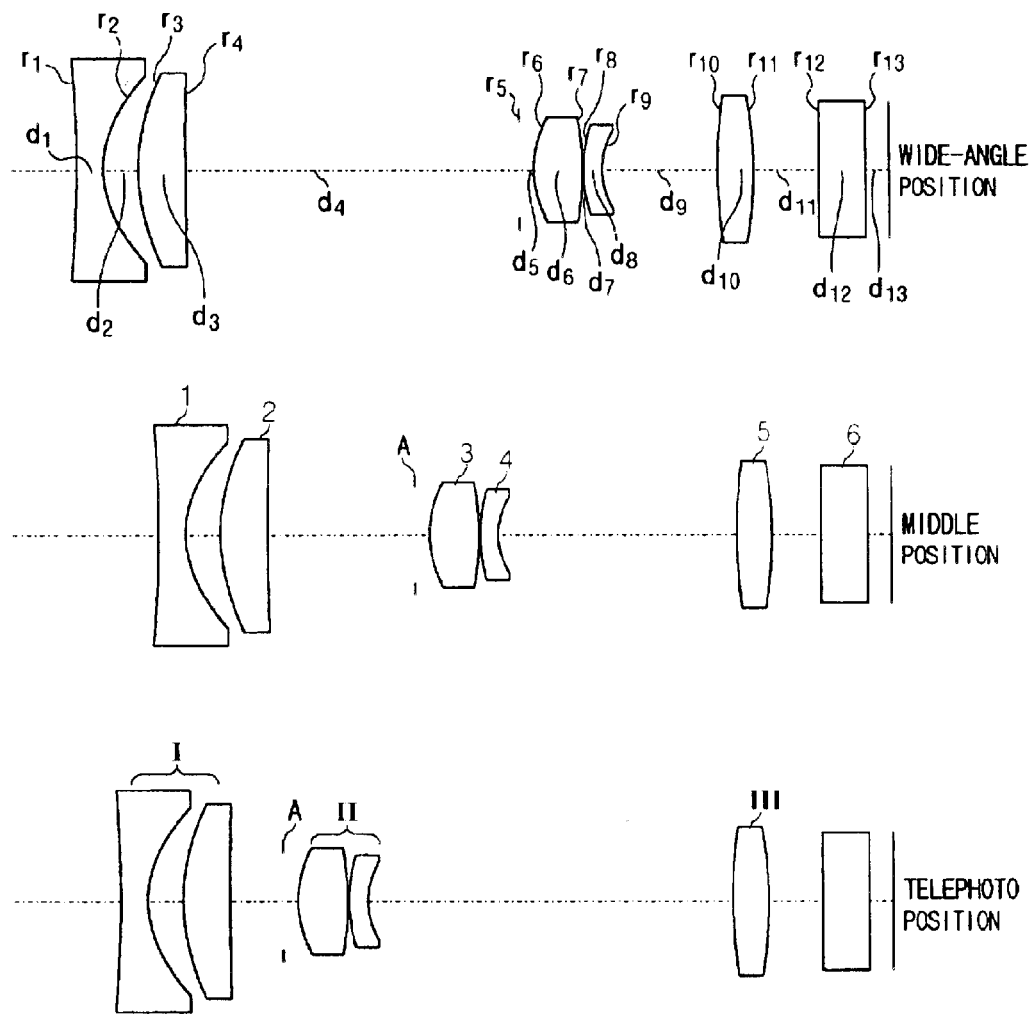
FIG. 9 illustrates the position-based configuration of a zoom lens according to a second example of the second embodiment of the present invention.
Figure 11:
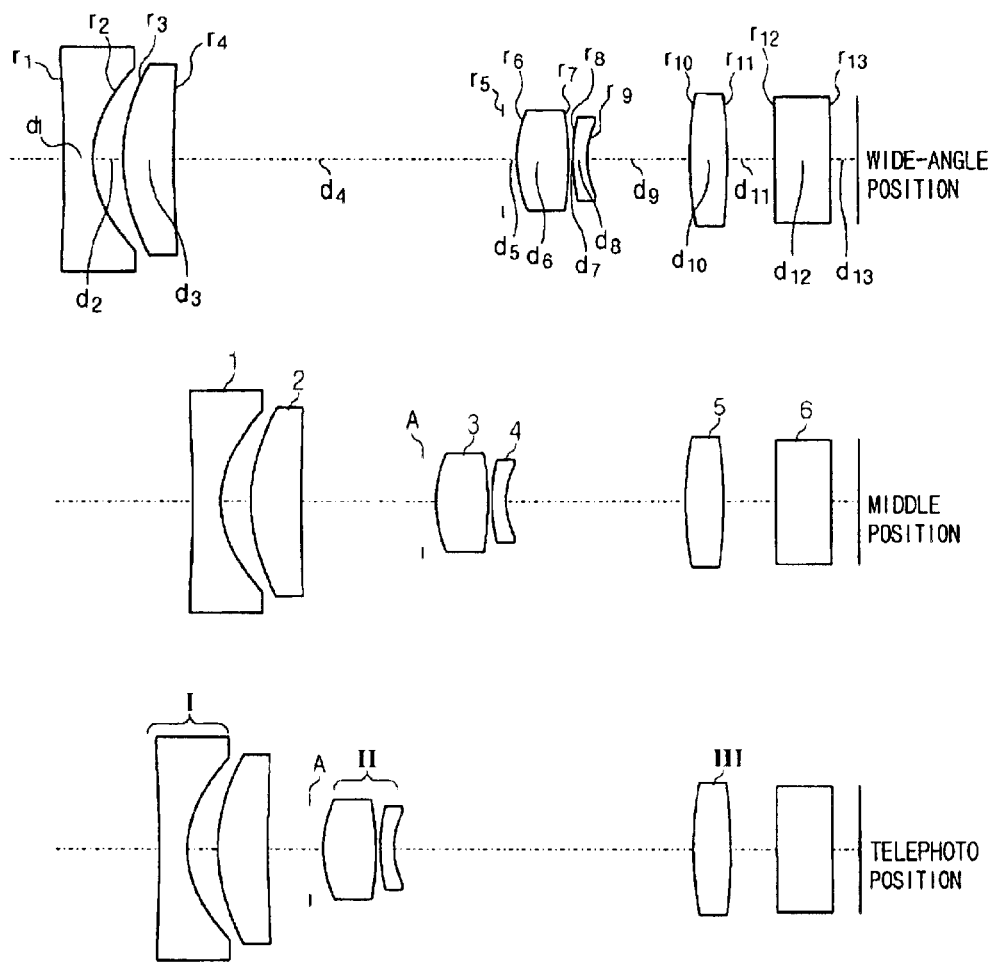
FIG. 11 illustrates the position-based configuration of a zoom lens according to a third example of the second embodiment of the present invention.

FIGS. 7, 9, and 11 illustrate the position-based configuration of the zoom lens according to the second embodiment of the present invention.

As shown in FIGS. 7, 9, and 11, the zoom lens according to the second embodiment of the present invention includes, in order from an object side, a first lens group I having a negative refractive power, a second lens group II having a positive refractive power, and a third lens group III having a positive refractive power, in the same manner as described in the first embodiment. The zoom lens also includes an iris diaphragm A located between the first and second lens groups I and II.

The following description describes the configuration of each lens group by way of first, second, and third examples in further detail.

The operation of the zoom lens according to the second embodiment of the present invention having the aforementioned structure is described as follows.

To secure a high zoom ratio even with a relatively simple construction, the zoom lens according to the second embodiment of the present invention has the second lens group II moved along the optical axis to achieve zooming, and the first lens group I and the third lens group III are moved to compensate for the resultant movement of the image side.

More specifically, the first lens group I or the first and third lens groups I and III are moved non-linearly to compensate for the movement of the image side caused by zooming, and the first lens group I or the third lens group III is moved to correct the focal position according to the zooming. The miniaturization of the optical system is facilitated in case of focusing with the third lens group III, because the moving lens group is so small in size.

In the second embodiment of the present invention, the first lens group I having a negative refractive power and the second lens group II having a positive refractive power are positioned on the object side, to secure a wide angle of view of greater than 60° at the wide-angle position and a sufficient amount of peripheral light. Particularly, high-variance lenses are arranged in the first and second lens groups I and II so as to cause little zooming chromatic aberration and realize a high resolution.

Convex lenses having a positive refractive power are arranged in the third lens group III to secure a sufficiently long retrofocal length. This allows the exit pupil to be as far apart from an image-forming medium as possible, so as to solve the problem of telecentricity in case of using an image-forming medium such as a image pickup device, i.e., to make the principal light from the peripheral image be linearly incident upon the image pickup device.

In addition, at least one lens having a negative refractive power and one lens having a positive refractive power are arranged in the first lens group 1. Particularly, the first lens group I includes, in order from the object side, the lens having a negative refractive power and the lens having a positive refractive power, and the lens having a positive refractive power is made of a high-variance material, so as to compensate for the zooming chromatic aberration even in the optical system having a high zoom ratio of more than 3×. The first lens group I also has an aspheric surface properly arranged to minimize the distortion and to secure a high image-forming performance adequate for an image-forming optical system for high mega-pixel image pickup devices.

The refractive power is distributed in the order from positive to negative in the second lens group II so as to acquire good optical performance for the whole image and to secure a high image-forming performance adequate for use for image pickup devices.

The zoom lens according to the second embodiment of the present invention satisfies the following conditional expression:

$$1.0 \le \frac{L_{II}}{\sqrt{f_W f_T}} \le 1.5 \qquad \text{[Conditional Expression 4]}$$

where $f_W$ denotes the total focal length at the wide-angle position; $f_T$ denotes the total focal length at the telephoto position; and $L_{II}$ denotes the displacement of the second lens group II from the wide-angle position to the telephoto position.

The Conditional Expression 4 defines the ratio of the displacement of the second lens group II to the composite focal length at the wide-angle position and the telephoto position.

When the embodied value exceeds the upper limit of the Conditional Expression 4, the refractive power of the second lens group II is reduced, increasing the displacement of the second lens group II from the wide-angle position to the telephoto position. Therefore, the lens overall length is increased and it becomes difficult to realize the miniaturization of the zoom lens.

On the other hand, when the embodied value falls below the lower limit of the Conditional Expression 4, the refractive power of the second lens group II increases, and it becomes difficult to secure a required retrofocal length at the wide-angle position.

The zoom lens according to the second embodiment of the present invention also satisfies the following conditional expression:

$$1.2 \le \frac{|f_I|}{\sqrt{f_W f_T}} \le 1.8 \qquad \text{[Conditional Expression 5]}$$

where $f_I$ denotes the focal length of the first lens group I.

The Conditional Expression 5 defines the ratio of the focal length of the first lens group I to the composite focal length at the wide-angle position and the telephoto position.

When the embodied value exceeds the upper limit of the Conditional Expression 5, the refractive power of the first lens group I is decreased, thereby increasing the over-all length of the optical system. In addition, it becomes difficult to secure a required retrofocal length at the wide-angle position and to correct the spherical aberration, coma, and astigmatism at the telephoto position.

On the other hand, when the embodied value falls below the lower limit of the Conditional Expression 5, the refractive power of the first lens group I is increased, deteriorating telecentricity.

The zoom lens according to the second embodiment of the present invention also satisfies the following conditional expression:

$$1.0 \le \frac{f_{II}}{\sqrt{f_W f_T}} \le 1.5 \qquad \text{[Conditional Expression 6]}$$

where $f_{II}$ denotes the focal length of the second lens group II.

The Conditional Expression 6 defines the ratio of the focal length of the second lens group II to the composite focal length at the wide-angle position and the telephoto position.

When the embodied value exceeds the upper limit of the Conditional Expression 6, the refractive power of the second lens group II is decreased, thereby increasing the displacement of the second lens group II during zooming. Therefore, it becomes difficult to realize the miniaturization of the zoom lens.

On the other hand, when the embodied value falls below the lower limit of the Conditional Expression 6, the refractive power of the second lens group II is increased, so it becomes difficult to correct the spherical aberration.

The zoom lens according to the second embodiment of the present invention also satisfies the following conditional expression:

$$1.5 \le \frac{f_{III}}{\sqrt{f_W f_T}} \le 3.0 \qquad \text{[Conditional Expression 7]}$$

where $f_{III}$ denotes the focal length of the third lens group III.

The Conditional Expression 7 defines the ratio of the focal length of the third lens group III to the composite focal length at the wide-angle position and the telephoto position.

When the embodied value exceeds the upper limit of the Conditional Expression 7, the refractive power of the third lens group III is decreased, thereby increasing the over-all length of the optical system and to deteriorate telecentricity.

On the other hand, when the embodied value falls below the lower limit of the Conditional Expression 7, the refractive power of the third lens group III is relatively increased. Therefore, it becomes difficult to secure a required retrofocal length at the wide-angle position and to correct the spherical aberration, coma, and astigmatism at the telephoto position.

The zoom lens according to the second embodiment of the present invention also satisfies the following conditional expression:

$$0.5 \le \frac{f_{IP}}{|f_I|} \le 1.0 \qquad \text{[Conditional Expression 8]}$$

where $f_{IP}$ denotes the focal length of a lens having a positive refractive power among the lenses of the first lens group I.

The Conditional Expression 8 defines the ratio of the focal length of the lens having a positive refractive power (hereinafter, referred to as "positive lens") among the first lens group I.

When the embodied value exceeds the upper limit of the Conditional Expression 8, the refractive power of the positive lens (e.g., the second lens) of the first lens group I is decreased, and it becomes difficult to correct the spherical and chromatic aberrations.

On the other hand, when the embodied value falls below the lower limit of the Conditional Expression 8, the refractive power of the positive lens of the first lens group I is relatively increased, thereby increasing the eccentric sensitivity and the sensitivity to the air gap between the positive lens and the lens having a negative refractive power (hereinafter referred to as "negative lens") such as the first lens in the first lens group. Therefore, it becomes difficult to manufacture the zoom lens.

Three examples of the present invention realized to satisfy the aforementioned conditions (Conditional Expressions 4 to 8) are described below.

In the description, "f" is the focal length, "ri (i=1 to 13)" is the radius of curvature of a lens face, "di (i=1 to 13)" is the thickness of a lens or the distance between lenses, "nd" is the refractive index, and "v" is the variance. Here, the unit of length is "mm (millimeter)".

For the zoom lens according to a first example of the second embodiment of the present invention, the F-number Fno is 2.83 to 5.34 between the wide-angle position and the telephoto position, with the focal length f being 5.98 mm to 17.30 mm and the angle of view 2ω being 64.10° to 23.72°. Particularly, the F-number Fno at the middle position is 4.04, the focal length f is 11.26, and the angle of view 2ω is 35.90°.

FIG. 7 shows the configuration of the zoom lens according to the first example of the second embodiment of the present invention that has the noted characteristics. The zoom lens comprises, as shown in FIG. 7, a first lens group I that includes a first lens 1 having a negative refractive power and a concave surface on both sides, and a second lens 2 having a positive refractive power and a convex surface on the object side; a second lens group II that includes a third lens 3 having a positive refractive power and a convex surface on both sides, and a fourth lens 4 having a negative refractive power and a convex meniscus surface on the object side; and a third lens group III that includes a fifth lens 5 having a positive refractive power and a convex surface on: both sides. The zoom lens also includes an optical filter 6 arranged on the image side of the fifth lens 5. The second lens 2 may have a convex meniscus surface on the object side.

Table 11 presents embodied values associated with the respective constituent lenses of the zoom lens according to the first example of the second embodiment of the present invention.

TABLE 11

| Face Number | Radius of Curvature (r) | Thickness, Distance (d) | Refractive Index (Nd) | Variance (v) |
|---|---|---|---|---|
| *1 | −32.95600 | 1.370000 | 1.8061 | 40.74 |
| *2 | 6.09300 | 1.690000 | | |
| 3 | 11.56800 | 2.250000 | 1.8052 | 25.46 |
| 4 | −187.80400 | D1 | | |
| 5 | ∞ | 0.500000 | | |
| *6 | 4.47600 | 2.230000 | 1.6935 | 53.20 |
| *7 | −20.53800 | 0.080000 | | |
| 8 | 8.91800 | 0.810000 | 1.8467 | 23.78 |
| 9 | 3.25100 | D2 | | |
| 10 | 19.45800 | 1.850000 | 1.5168 | 64.20 |
| 11 | −19.45800 | D3 | | |
| 12 | ∞ | 2.000000 | 1.5168 | 64.20 |
| 13 | ∞ | 0.999755 | | |

The symbol "*" indicates the aspheric surface. The aspheric surface coefficients according to the first example of the second embodiment of the present invention are presented in Table 12. The first lens 1 of the first lens group I, and the third lens 3 of the second lens group II have an aspheric surface on both sides.

TABLE 12

| Aspheric Surface Coefficients of First Face | | Aspheric Surface Coefficients of Second Face | |
|---|---|---|---|
| K | 0.000000 | K | −0.685315 |
| A | 0.342744E−03 | A | 0.182868E−03 |
| B | −0.900935E−05 | B | −0.636049E−05 |
| C | 0.148469E−06 | C | −0.120351E−06 |
| D | −0.802789E−09 | D | 0.601128E−08 |

| Aspheric Surface Coefficients of Sixth Face | | Aspheric Surface Coefficients of Seventh Face | |
|---|---|---|---|
| K | −1.354706 | K | −21.516673 |
| A | 0.817882E−03 | A | 0.894502E−04 |
| B | −0.656492E−04 | B | −0.659099E−04 |
| C | 0.725773E−05 | C | 0.236769E−05 |
| D | −0.933695E−06 | D | −0.644861E−06 |

The variations of the distance D1 between the second lens 2 and the iris diaphragm A, the distance D2 between the fourth lens 4 and the fifth lens 5, and the distance D3 between the fifth lens 5 and the optical filter 6 during zooming are presented in Table 13.

TABLE 13

| Face No. | Wide-angle position | Middle position | Telephoto position |
|---|---|---|---|
| D1 | 15.444 | 6.362 | 1.900 |
| D2 | 5.441 | 12.869 | 19.158 |
| D3 | 3.169 | 1.869 | 1.869 |

FIGS. 8a and 8b show the aberrations at the wide-angle position and the telephoto position of the zoom lens according to the first example of the second embodiment of the present invention, respectively.

For a zoom lens according to a second example of the second embodiment of the present invention, the F-number Fno is 2.87 to 5.09 between the wide-angle position and the telephoto position, the focal length f is 5.10 mm to 14.76 mm, and the angle of view 2ω is 60.23° to 21.93° Particularly, the F-number Fno at the middle position is 3.98, the focal length f is 9.71 mm, and the angle of view 2ω is 32.97°.

FIG. 9 shows the configuration of the zoom lens according to the second example of the second embodiment of the present invention that has the noted characteristics. The zoom lens, as shown in FIG. 9, has the same configuration as previously described in regard to the first example.

Table 14 presents embodied values associated with the respective constituent lenses of the zoom lens according to the second example of the second embodiment of the present invention.

TABLE 14

| Face Number | Radius of Curvature (r) | Thickness, Distance (d) | Refractive Index (Nd) | Variance (v) |
|---|---|---|---|---|
| *1 | −47.08600 | 1.200000 | 1.8061 | 40.74 |
| *2 | 5.07600 | 1.450000 | | |
| 3 | 9.20500 | 2.000000 | 1.8052 | 25.46 |
| 4 | 150.92600 | D1 | | |
| 5 | ∞ | 0.600000 | | |
| *6 | 4.45600 | 2.110000 | 1.6935 | 53.20 |
| *7 | −14.91500 | 0.080000 | | |
| 8 | 8.03100 | 0.740000 | 1.8467 | 23.78 |
| 9 | 3.10400 | D2 | | |
| 10 | 18.46400 | 1.570000 | 1.5168 | 64.20 |
| 11 | −18.46400 | D3 | | |
| 12 | ∞ | 2.000000 | 1.5168 | 64.20 |
| 13 | ∞ | 1.000048 | | |

The symbol "*" indicates an aspheric surface. In the second example of the second embodiment, both sides of the first lens 1 of the first lens group I, and both sides of the third lens 3 of the second lens group II have an aspheric surface. The aspheric surface coefficients are presented in Table 15.

TABLE 15

| Aspheric Surface Coefficients of First Face | | Aspheric Surface Coefficients of Second Face | |
|---|---|---|---|
| K | 0.000000 | K | −0.763131 |
| A | 0.249183E−03 | A | 0.180018E−03 |
| B | −0.466999E−05 | B | −0.205581E−05 |
| C | 0.997049E−07 | C | 0.130438E−06 |
| D | −0.147116E−08 | D | −0.843422E−08 |

| Aspheric Surface Coefficients of Sixth Face | | Aspheric Surface Coefficients of Seventh Face | |
|---|---|---|---|
| K | −1.654745 | K | −7.452787 |
| A | 0.870252E−03 | A | −0.146634E−03 |
| B | −0.176186E−03 | B | −0.211278E−05 |
| C | 0.114168E−04 | C | 0.498829E−05 |
| D | −0.243845E−05 | D | −0.111244E−05 |

The variations of the distance D1 between the second lens 2 and the iris diaphragm A, the distance D2 between the fourth lens 4 and the fifth lens 5, and the distance D3 between the fifth lens 5 and the optical filter 6 during zooming are presented in Table 16.

TABLE 16

| Face No. | Wide-angle position | Middle position | Telephoto position |
|---|---|---|---|
| D1 | 15.197 | 6.244 | 2.263 |
| D2 | 4.914 | 11.173 | 16.599 |
| D3 | 2.701 | 1.926 | 2.148 |

Figure 10A:
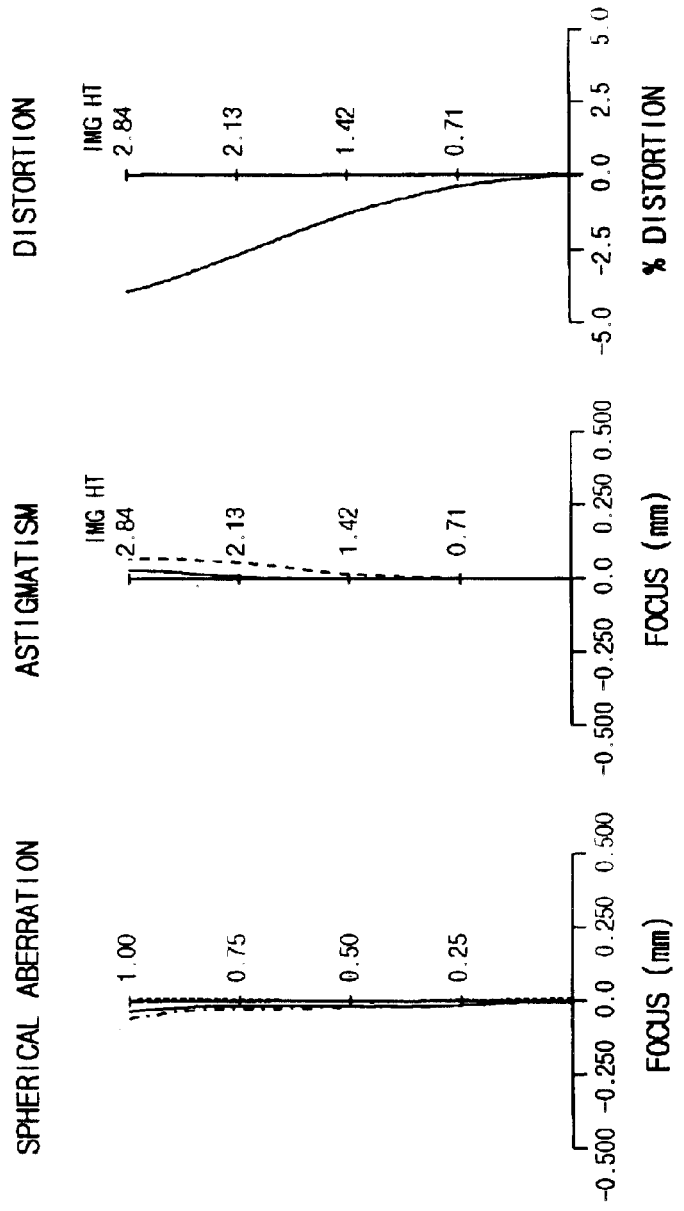

FIGS. 10a and 10b show the aberrations at the wide-angle position and the telephoto position of the zoom lens according to the second example of the second embodiment of the present invention, respectively.

For a zoom lens according to a third example of the second embodiment of the present invention, the F-number Fno is 2.86 to 4.87 between the wide-angle position and the telephoto position, with the focal length f being 4.00 mm to 11.57 mm and the angle of view 2ω being 60.72° to 22.14°. Particularly, the F-number Fno at the middle position is 3.83, the focal length f is 7.74 mm, and the angle of view 2ω is 32.85°.

FIG. 11 shows the configuration of the zoom lens according to the third example of the second embodiment of the present invention that has the noted characteristics. The zoom lens, as shown in FIG. 11, has the same configuration as previously described in regard to the first example.

Table 17 presents embodied values associated with the respective constituent lenses of the zoom lens according to the third example of the second embodiment of the present invention.

TABLE 17

| Surface Number | Radius of Curvature (r) | Thickness, Distance (d) | Refractive Index (Nd) | Variance (v) |
|---|---|---|---|---|
| *1 | −16.30000 | 1.000000 | 1.8061 | 40.74 |
| *2 | 5.06500 | 1.090000 | | |
| 3 | 7.45200 | 1.850000 | 1.8052 | 25.45 |
| 4 | 74.48400 | D1 | | |
| 5 | ∞ | 0.500000 | | |
| *6 | 3.98500 | 1.970000 | 1.6935 | 53.20 |
| *7 | −9.38800 | 0.100000 | | |
| 8 | 7.33300 | 0.500000 | 1.8467 | 23.78 |
| 9 | 2.80800 | D2 | | |
| 10 | 17.31100 | 1.360000 | 1.5168 | 64.20 |
| 11 | −17.52600 | 03 | | |
| 12 | ∞ | 2.000000 | 1.5168 | 64.20 |
| 13 | ∞ | 0.999683 | | |

The symbol "*" indicates an aspheric surface. In the third example of the second embodiment, both sides of the first lens 1 of the first lens group I, and both sides of the third lens 3 of the second lens group II have an aspheric surface. The aspheric surface coefficients are presented in Table 18.

TABLE 18

| Aspheric Surface Coefficients of First Face | | Aspheric Surface Coefficients of Second Face | |
|---|---|---|---|
| K | 0.000000 | K | −0.279487 |
| A | 0.273617E−02 | A | 0.226345E−02 |
| B | −0.126193E−03 | B | 0.184699E−04 |
| C | 0.239511E−05 | C | −0.159298E−04 |
| D | −0.422503E−09 | D | 0.642625E−06 |

| Aspheric Surface Coefficients of Sixth Face | | Aspheric Surface Coefficients of Seventh Face | |
|---|---|---|---|
| K | −2.111100 | K | 5.151340 |
| A | 0.123815E−02 | A | 0.808235E−03 |
| B | −0.304806E−03 | B | −0.220064E−03 |
| C | 0.935420E−05 | C | −0.292824E−04 |
| D | −0.686632E−05 | D | 0.251232E−06 |

The variations of the distance D1 between the second lens 2 and the iris diaphragm A, the distance D2 between the fourth lens 4 and the fifth lens 5, and the distance D3 between the fifth lens 5 and the optical filter 6 during zooming are presented in Table 19.

TABLE 19

| Face No. | Wide-angle position | Middle position | Telephoto position |
|---|---|---|---|
| D1 | 13.041 | 4.402 | 1.522 |
| D2 | 3.810 | 7.631 | 11.994 |
| D3 | 1.691 | 1.873 | 1.682 |

Figure 12A:
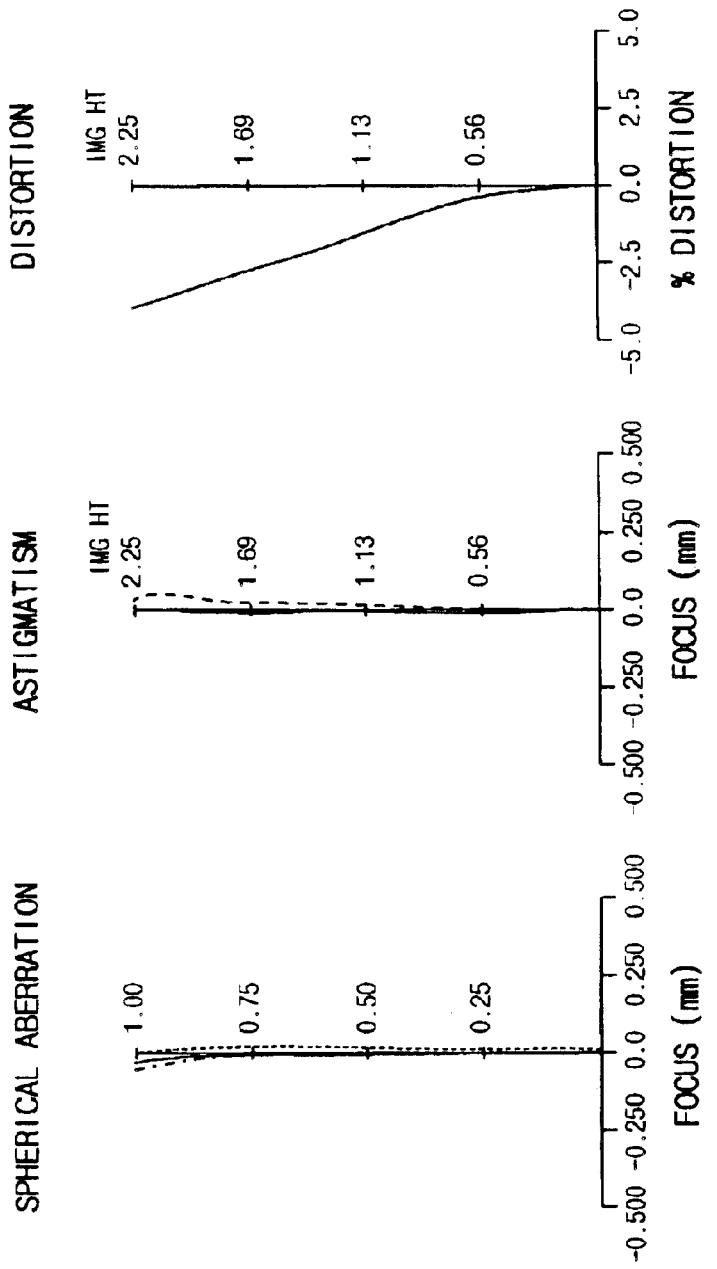
FIGS. 12a and 12b are graphs showing the aberrations at the wide-angle position and the telephoto position of the zoom lens according to the third example of the second embodiment of the present invention, respectively.
Figure 12B:
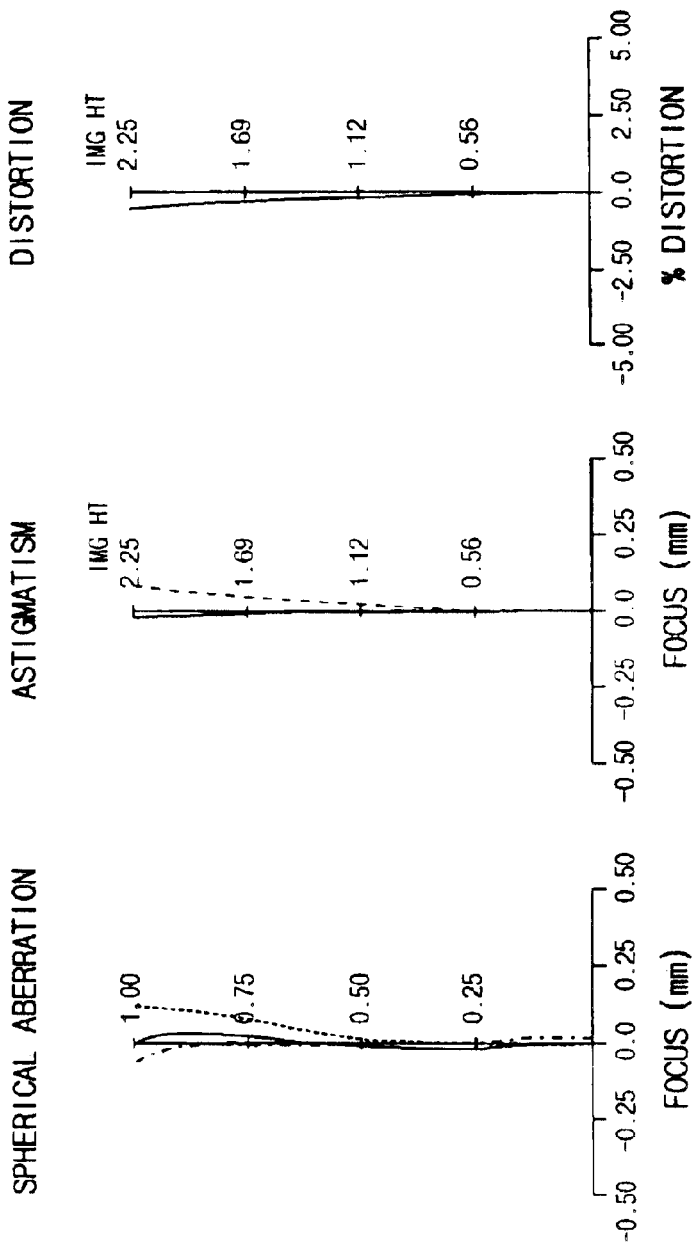

FIGS. 12a and 12b show the aberrations at the wide-angle position and the telephoto position of the zoom lens according to the third example of the second embodiment of the present invention, respectively.

The zoom lenses according to the examples of the second embodiment of the present invention that have the above embodied values satisfy the aforementioned conditions (Conditional Expressions 4 to 8), and the embodied values of the respective conditional expressions are presented in Table 20.

TABLE 20

| | Example 1 | Example 2 | Example 3 |
|---|---|---|---|
| Conditional Expression 4 | 1.22 | 1.28 | 1.20 |
| Conditional Expression 5 | 1.54 | 1.56 | 1.61 |
| Conditional Expression 6 | 1.20 | 1.27 | 1.28 |
| Conditional Expression 7 | 1.87 | 2.08 | 2.50 |
| Conditional Expression 8 | 0.86 | 0.89 | 0.92 |

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims. For example, although the above-stated embodiments disclose the lens values in the case where the first and third lenses 1 and 3 have an aspheric surface on both sides thereof, it is evident to those skilled in the art that the lens values for the case where the first and third lenses 1 and 3 have at least one aspheric surface can also be used in accordance with the claims of the present invention based on the embodiments.

As described above, the embodiment of the present invention provides a miniature zoom lens having high optical performance that uses a small number of lenses and easily realizes the correction of aberrations.

The present invention also provides a zoom lens having a high zoom ratio of about 2× to 3× with a simple configuration. In addition, the present invention readily replaces lenses with plastic lenses by properly arranging aspheric lenses to provide a low-cost zoom lens having high optical performance.

What is claimed is:

1. A zoom lens comprising, in order from an object side:
   a first lens group entirely having a negative refractive power, the first lens group including a first lens having a negative refractive power, and a second lens having a positive refractive power;
   a second lens group entirely having a positive refractive power, the second lens group including a third lens having a positive refractive power, and a fourth lens having a negative refractive power; and
   a third lens group entirely having a positive refractive power, the third lens group including a fifth lens having a positive refractive power,
   the zoom lens satisfying the following conditional expression, $$-3.0 < \frac{f_1}{f_w} < -2.0$$

wherein $f_1$ denotes the focal length of the first lens group, and $f_w$ denotes the total focal length at a wide-angle position.

2. The zoom lens as claimed in claim 1, wherein the second lens includes at least one aspheric surface.

3. The zoom lens as claimed in claim 1, wherein the second lens comprises a plastic lens.

4. The zoom lens as claimed in claim 1, wherein at least one of the lenses in each lens group comprises a plastic lens.

5. The zoom lens as claimed in claim 1, wherein the second lens has at least one aspheric surface;

the fourth lens has at least one aspheric surface; and the fifth lens has at least one aspheric surface.

6. The zoom lens as claimed in claim 5, wherein the lens having an aspheric surface in each lens group comprises a plastic lens.

7. The zoom lens as claimed in claim 1, wherein at least one of the lenses in each lens group comprises an aspheric lens.

8. The zoom lens as claimed in claim 1, wherein the zoom lens further satisfies the following conditional expression:

$$N_{d2} = N_{d4}$$

wherein $N_{d2}$ denotes the refractive index of the second lens; and $N_{d4}$ denotes the refractive index of the fourth lens.

9. The zoom lens as claimed in claim 1, wherein the zoom lens further satisfies the following conditional expression:

$$N_{d1} = N_{d3}$$

wherein $N_{d1}$ denotes the refractive index of the first lens; and $N_{d3}$ denotes the refractive index of the third lens.

10. The zoom lens as claimed in claim 1, wherein the zoom lens further satisfies the following conditional expression:

$$0.8 < \frac{f_{g2}}{f_{g5}} < 1.0$$

wherein $f_{g2}$ denotes the focal length of the second lens; and $f_{g5}$ denotes the focal length of the fifth lens.

11. The zoom lens as claimed in claim 1, wherein the zoom lens further satisfies the following conditional expression:

$$1.7 < \frac{f_2}{f_w} < 2.1$$

wherein $f_2$ denotes the focal length of the second lens group.

12. The zoom lens as claimed in claim 1, wherein the second lens has a convex surface on both sides.

13. The zoom lens as claimed in claim 1, wherein the first, second, and third lens groups are moved along an optical axis during zooming from the wide-angle position to a telephoto position.

14. The zoom lens as claimed in claim 1, wherein zooming from a wide-angle position to a telephoto position reduces the distance between the first and the second lens groups and increases the distance between the second and the third lens groups.

15. The zoom lens as claimed in claim 1, wherein during zooming from a wide-angle position to a telephoto position, the first lens group moves toward the image side of the zoom lens, the second lens group moves toward the object side of the zoom lens, and the third lens group moves toward the image side of the zoom lens.

16. The zoom lens as claimed in claim 1, wherein the first lens includes a concave surface on both sides, the second lens includes a convex surface on both sides, the third lens includes a convex surface on both sides, the fourth lens includes a concave surface on both sides, and the fifth lens includes a convex meniscus surface on the image side of the fifth lens.

17. A zoom lens comprising, in order from an object side:

a first lens group entirely having a negative refractive power, the first lens group including a first lens having a negative refractive power and a second lens having a positive refractive power;

a second lens group entirely having a positive refractive power, the second lens group including a third lens having a positive refractive power, and a fourth lens having a negative refractive power; and a third lens group entirely having a positive refractive power, the third lens group including at least one fifth lens having a positive refractive power, the zoom lens satisfying the following conditional expression, $$1.0 \leq \frac{f_{II}}{\sqrt{f_W f_T}} \leq 1.5$$

wherein $f_{II}$ denotes the focal length of the second lens group, $f_W$ denotes the total focal length at the wide-angle position, and $f_T$ denotes the total focal length at the telephoto position.

18. The zoom lens as claimed in claim 17, wherein the first lens includes a concave surface on both sides, the second lens includes a convex surface on both sides, the third lens includes a convex surface on both sides, the fourth lens includes a convex meniscus surface on the object side of the fourth lens, and the fifth lens includes a convex surface on both sides.

19. The zoom lens as claimed in claim 17, wherein during zooming from the wide-angle position to the telephoto position, the second lens group moves along an optical axis to perform the zooming, and the first and third lens groups move to compensate for the zooming.

20. The zoom lens as claimed in claim 17, wherein during zooming from the wide-angle position to the telephoto position, the second lens group moves along an optical axis to perform the zooming, and the first lens group or the third lens group is moved to correct the focal position according to the zooming.

21. The zoom lens as claimed in claim 17, wherein the zoom lens further satisfies the following conditional expression:

$$1.0 \leq \frac{L_{II}}{\sqrt{f_W f_T}} \leq 1.5$$

wherein $L_{II}$ denotes the displacement of the second lens group from the wide-angle position to the telephoto position.

22. The zoom lens as claimed in claim 17, wherein the zoom lens further satisfies the following conditional expression:

$$1.2 \leq \frac{|f_1|}{\sqrt{f_W f_T}} \leq 1.8.$$

23. The zoom lens as claimed in claim 17, wherein the zoom lens further satisfies the following conditional expression:

$$1.5 \leq \frac{f_{III}}{\sqrt{f_W f_T}} \leq 3.0$$

wherein $f_{III}$ denotes the focal length of the third lens group.

24. The zoom lens as claimed in claim 17, wherein the zoom lens further satisfies the following conditional expression:

$$0.5 \leq \frac{f_{1P}}{|f_1|} \leq 1.0$$

wherein $f_I$ denotes the focal length of the first lens group, and $f_{IP}$ denotes the focal length of a lens having a positive refractive power among the lenses of the first lens group.

25. The zoom lens as claimed in claim 17, wherein the first and second lens groups include at least one aspheric surface.

26. The zoom lens as claimed in claim 17, wherein the third lens group comprises one lens.

27. A zoom lens comprising, in order from an object side:
   a first lens group entirely having a negative refractive power, the first lens group including a first lens having a negative refractive power and a concave surface on both sides thereof, and a second lens having a positive refractive power and a convex surface on the object side thereof;
   a second lens group entirely having a positive refractive power, the second lens group including a third lens having a positive refractive power, and a fourth lens having a negative refractive power and a convex meniscus surface on the object side thereof; and
   a third lens group entirely having a positive refractive power, the third lens group including at least one fifth lens having a positive refractive power,
   wherein during zooming from a wide-angle position to a telephoto position, the distance between the first and second lens groups is reduced, and the distance between the second and third lens groups is increased, and
   the zoom lens satisfies the following conditional expression, $$0.5 \leq \frac{f_{1P}}{|f_1|} \leq 1.0$$

wherein $f_I$ denotes the focal length of the first lens group, and $f_{IP}$ denotes the focal length of a lens having a positive refractive power among the lenses of the first lens group.

* * * * *